United States Patent [19]

Crawford

[11] Patent Number: 5,604,855

[45] Date of Patent: Feb. 18, 1997

[54] COMPUTER STORY GENERATION SYSTEM AND METHOD USING NETWORK OF RE-USABLE SUBSTORIES

[76] Inventor: Christopher C. Crawford, 5251 Sierra Rd., San Jose, Calif. 95132

[21] Appl. No.: 313,989

[22] Filed: Sep. 28, 1994

[51] Int. Cl.⁶ ................................................ G06T 13/00
[52] U.S. Cl. ........................ 395/173; 395/174; 395/806; 463/9; 463/23
[58] Field of Search .................................... 395/152, 154; 273/434; 463/9, 23

[56] References Cited

U.S. PATENT DOCUMENTS

| 5,358,259 | 10/1994 | Best | 273/434 |
| 5,377,997 | 1/1995 | Wilden et al. | 273/434 |
| 5,393,073 | 2/1995 | Best | 273/434 |

OTHER PUBLICATIONS

Meston, "Realms of Arkania", *Compute*, vol. 15, No. 12, Dec. 1993, p. 132.
Brenesal, "SSI challenges your intellect and your senses in a new game", *PC Magazine*, vol. 10, No. 16, Sep./1991, p. 498.
Dewey, "Saving the universe without your skateboard: new role playing fiction.", *Small Computer in Libraries*, vol. 8, No. 10, Nov. 1988, p. 31.
Knuth, *The Art of Computer Programming*, 1973, pp. 371–373.

*Primary Examiner*—Heather R. Herndon
*Assistant Examiner*—Stephen Hong
*Attorney, Agent, or Firm*—Gary S. Williams; Flehr, Hohbach, Test, Albritton & Herbert

[57] ABSTRACT

The storyline of a dynamically generated entertainment program, such as a video game, is generated using a matrix of reusable storyline fragments called substories. A set of characters that participate in the storyline is established and a set of reusable substories is defined. Each substory represents a "fragment of a story", usually involving an action by a subject, where the subject is one of the characters. Most substories can be reused multiple times with different ones of the characters being the subject and different ones of the characters being the direct object of the substory. Each substory has a set of possible reaction substories, which are a subset of the defined substories. A plan list stores plan data indicating ones of the substories to be performed at specified times. An initial "seed story" in the form of an initial set of substories is stored in the plan list. The substories stored in the plan list are executed at times corresponding to their respective specified times. For at least a subset of the executed substories, the end user of the system is either shown a video image representing the executed substory or is otherwise informed of the executed substory. In reaction to each executed substory, plans to perform additional ones of the substories are generated. The additional substories are ones of the set of possible reaction substories for each executed substory. Each plan to perform an additional substory is assigned a specified time and plan data representing the plan is stored in the plan list.

9 Claims, 9 Drawing Sheets

Personality Profile Table 160

| Char ID | Name | Location | Sex | Significant Other | OnStage | Pride | Good | Submissive | Empathy | Gullible | Initiative | Volatility | Strength | Greed | Lust | Sexiness | ... |
|---|---|---|---|---|---|---|---|---|---|---|---|---|---|---|---|---|---|
| 1 | Arthur | 6 | M | 0 | T | 95 | 70 | 10 | 50 | 30 | 80 | 50 | 90 | 20 | 60 | 60 | ... |
| 2 | Guenevere | 3 | F | 1 | T | 60 | 65 | 75 | 80 | 75 | 75 | 60 | 15 | 35 | 100 | 80 | ... |
| 3 | Merlin | 1 | M | 20 | T | 39 | 39 | 39 | 39 | 39 | 39 | 39 | 39 | 39 | 39 | 39 | ... |
| 4 | Lancelot | 6 | M | 0 | T | 60 | 70 | 10 | 60 | 30 | 80 | 35 | 100 | 20 | 100 | 99 | ... |
| 5 | Mordred | 3 | M | 10 | T | 95 | 5 | 10 | 10 | 0 | 80 | 15 | 40 | 90 | 80 | 30 | ... |
| 7 | Kay | 3 | M | 0 | T | 40 | 70 | 75 | 40 | 60 | 60 | 25 | 40 | 55 | 30 | 25 | ... |
| ... | ... | ... | ... | ... | ... | ... | ... | ... | ... | ... | ... | ... | ... | ... | ... | ... | ... |

Relationship Tables
164

Guenevere

| Char ID | Name | Dominance | Affection | Trust | Loquaciousness | Relationship | BloodTie |
|---|---|---|---|---|---|---|---|
| 1 | Arthur | -40 | 60 | 50 | 50 | 3 | F |
| 2 | Guenevere | 100 | 100 | 50 | 50 | 0 | T |
| 3 | Merlin | NA | NA | NA | NA | NA | NA |
| 4 | Lancelot | -50 | 80 | 50 | 60 | 1 | F |
| 5 | Mordred | -20 | -50 | 50 | 10 | 0 | F |
| 7 | Kay | -20 | 40 | 50 | 50 | 1 | F |
| 8 | Bedivere | 0 | 30 | 50 | 40 | 1 | F |
| 9 | Gawain | 20 | 40 | 50 | 40 | 0 | F |
| ⋮ | ⋮ | ⋮ | ⋮ | ⋮ | ⋮ | ⋮ | ⋮ |

Lancelot

| Char ID | Name | Dominance | Affection | Trust | Loquaciousness | Relationship | BloodTie |
|---|---|---|---|---|---|---|---|
| 1 | Arthur | -70 | 90 | 50 | 50 | 1 | F |
| 2 | Guenevere | 50 | 90 | 50 | 60 | 1 | F |
| 3 | Merlin | NA | NA | NA | NA | NA | NA |
| 4 | Lancelot | 100 | 100 | 50 | 50 | 0 | T |
| 5 | Mordred | 40 | -10 | 50 | -10 | 0 | F |
| 7 | Kay | 20 | 40 | 50 | 50 | 1 | F |
| 8 | Bedivere | 20 | 30 | 50 | 50 | 1 | F |
| 9 | Gawain | 20 | -30 | 50 | 50 | 1 | F |
| ⋮ | ⋮ | ⋮ | ⋮ | ⋮ | ⋮ | ⋮ | ⋮ |

FIGURE 7

SubStory Param Table 170

| SubStory ID | Name | TimeTo Prepare | TimeTo Execute | Import | Audience | Expression |
|---|---|---|---|---|---|---|
| 1 | AbuseLover | 1024 | 1 | 40 | 2 | 45 |
| 2 | Accept Apology | 1 | 1 | 28 | 1 | 58 |
| 3 | AcceptRaid | 1 | 1 | 20 | 1 | 39 |
| 4 | AccompanyDigRoots | 1 | 1 | 20 | 1 | 47 |
| 5 | AccompanyBathing | 10 | 1 | 20 | 1 | 47 |
| 12 | AccuseAmbush | 2 | 1 | 70 | 1 | 15 |
| ... | ... | ... | ... | ... | ... | ... |

COMPUTER STORY GENERATION SYSTEM AND METHOD USING NETWORK OF RE-USABLE SUBSTORIES

The present invention relates generally to computer operated video games and computer operated entertainment programs, and particularly to a methodology for generating stories and sequences of events involving interactions between fictional characters where the generation of each sequence of events utilizes a matrix of re-usable substories whose use and selection is based on personality profiles of the fictional characters, user selections or commands, past events remembered by the fictional characters, as well as random factors.

BACKGROUND OF THE INVENTION

Most commercially available video games available in 1994 are (A) highly violent warfare motifs that test the user's reflexes and knowledge of the rules of the game, (B) "exploration" games in which the user passes though and explores various places, (C) simulator games such as flight simulator games, which are a variation on exploration games but which test a user's ability to operate a simulated vehicle or other device while exploring various simulated places, and (D) card games and computer operated versions of "board games". While this list is not exhaustive, it serves to highlight the differences between the present invention and what preceded it.

The present invention represents a new video game methodology that generates a storyline using a set of re-usable substories. In particular, substories represent an action or event that can take place in the execution of a game, and furthermore, most substories represent actions that can be performed by many of the fictional characters in the game. Thus, each substory will have a set of variables, usually including a "subject" (the character performing the action in the substory), and a direct object (the person, if any, who is the target or recipient of the action). Some substories have additional objects (additional persons who are the targets or recipients of the action), indirect objects (e.g., the action by the subject on the direct object relates in some manner to the indirect object. For instance a substory whose title might be (DefendsOther) might represent A (the subject) defending B (the indirect object) against an attack by C (the direct object).

The characters fulfilling the various roles of each selected substory are dynamically assigned during the execution of the game, and each substory can be reused numerous times with the same or different characters fulfilling the various roles associated with the selected substory.

The present invention also allows for much more "human" interactions between characters. For instance, characters can be assigned personality traits such as pride, empathy, gullibility, initiative, volatility, strength, greed, lust and sexiness, as well as interpersonal relationship traits such as affection, dominance, trust, blood ties, and loquaciousness that define each character's specific relationship to other characters in a game.

An important characteristic of the present invention is that interactions between fictional characters in games utilizing the present invention can be based on events that happened in the past (i.e, earlier in the game). Some prior video games make some minimal use of "history", primarily by (A) retaining ongoing scores for various players, (B) making a game more difficult to play as the user reaches higher score levels, (C) remembering which players that have been eliminated.

Unlike such minimal uses of history, in the present invention fictional characters chose to perform actions based on historical events, such as because Character A hurt (or insulted, killed, helped, didn't help, raped, or saved) my sister (brother, other relationship), I'm going to do the following to Character A.

Another example of using "history" in accordance with the present invention is as follows. Assume that Character A and Character B have had a number of prior interactions in which Character A hurts or insults Character B. Each time that the system selects a reaction for Character B, the system searches for a specific types of prior events in which Character B is the subject and Character A is the direct object. For instance, if Character B has already done actions 1, 2 and 3 in the past, then the system will select a particular reaction substory (e.g., a different action 4) based on that information. This and other types of "sequence of reactions" can be implemented for numerous types of substories. In this way, the game can have characters perform sequences of actions that have logical connections and order, thereby giving the generated games a feeling of robustness.

Another feature of the present application that is unlike prior products is that part of "what happens" in a game or computer generated entertainment program in the present invention happens in the form of news or "gossip" told by one fictional character to another. In this way information is communicated from one character to another, allowing additional characters to "choose" actions based on that information. In particular, when a character is told of a past event, the system may generate a reaction plan to be executed by that character in the future where the reaction plan is specifically in reaction to the past event.

The present invention uses a matrix of re-usable substories which are "selected" during the execution of a game. Any given event during the execution of game or computer generated entertainment program in the present invention is an instance of a predefined substory, with a particular subject and direct object used during the execution of the substory instance. The characters who witness an event or who are told of an event react to the event or news by "making plans" for the future. The "choices" made by fictional characters in the present invention are, in fact, selections of ones of the substories in the matrix of substories provided by the present invention.

A "plan" is a substory selection for execution "by" one of the characters (i.e., with the character to whom the plan is assigned being the subject of the plan). One aspect of each substory is that each substory has an associated set of "consequent substories", which is a finite set of reaction plans that the subject, direct object or any witnesses of an event (i.e., an executed substory) may make in response to the event. All the possible plans that the event's participants and witnesses may make in reaction to the event are evaluated and a subset of those possible plans are selected in accordance with story line weights that are computed or otherwise assigned to the set of possible reaction plans. The selected reaction plans are then entered into a plan list or queue for later execution.

SUMMARY OF THE INVENTION

In summary, the present invention is a system and method for dynamically generating the storyline of an entertainment program, such as a video game. The storyline is generated using a matrix of reusable storyline fragments called substories.

A set of characters that participate in the storyline is established and a set of reusable substories is defined. The characters are assigned personality traits that are used during execution of the entertainment program to select substories for including in the storyline.

Each substory represents a "fragment of a story". Most substories involve an action by a subject, where the subject is one of the characters, but some substories do not involve any overt action other than making a plan to do something or telling something (e.g., about a past event, or a lie) to another character. Most substories can be reused multiple times with different ones of the characters being the subject and different ones of the characters being the direct object of the substory. Each substory has a set of possible reaction substories, which are a subset of the defined substories.

A plan list stores plan data indicating ones of the substories to be performed at specified times. An initial "seed story" in the form of an initial set of substories is stored in the plan list. The substories stored in the plan list are executed at times corresponding to their respective specified times. For at least a subset of the executed substories, the end user of the system is either shown a video image representing the executed substory or is otherwise informed of the executed substory.

In reaction to each executed substory, plans to perform additional instances of the substories are generated. The additional substories are ones of the set of possible reaction substories for each executed substory. Each plan to perform an additional substory is assigned a specified time and plan data representing the plan is stored in the plan list. Each plan that is put in the plan list specifies a substory, a designated subject and direct object, and an execution time. The designated subject and direct object in each plan are usually related to the participants of the previous event to which the plan is a reaction.

Personality parameters in the character's personality profiles are used as input parameters to functions that are used to select the substory to be performed in reaction to an executed substory. Furthermore, character reactions to executed substories include "emotional reactions" that are used to change those characters' personality profiles.

BRIEF DESCRIPTION OF THE DRAWINGS

Additional objects and features of the invention will be more readily apparent from the following detailed description and appended claims when taken in conjunction with the drawings, in which:

FIG. 6 is a schematic representation of a personality profile table data structure used in a preferred embodiment the present invention.

FIG. 7 is a schematic representation of personality relationship tables used in a preferred embodiment the present invention.

FIG. 8 is a schematic representation of a substory parameters array data structure used in a preferred embodiment the present invention.

DESCRIPTION OF THE PREFERRED EMBODIMENTS

Figure 1:
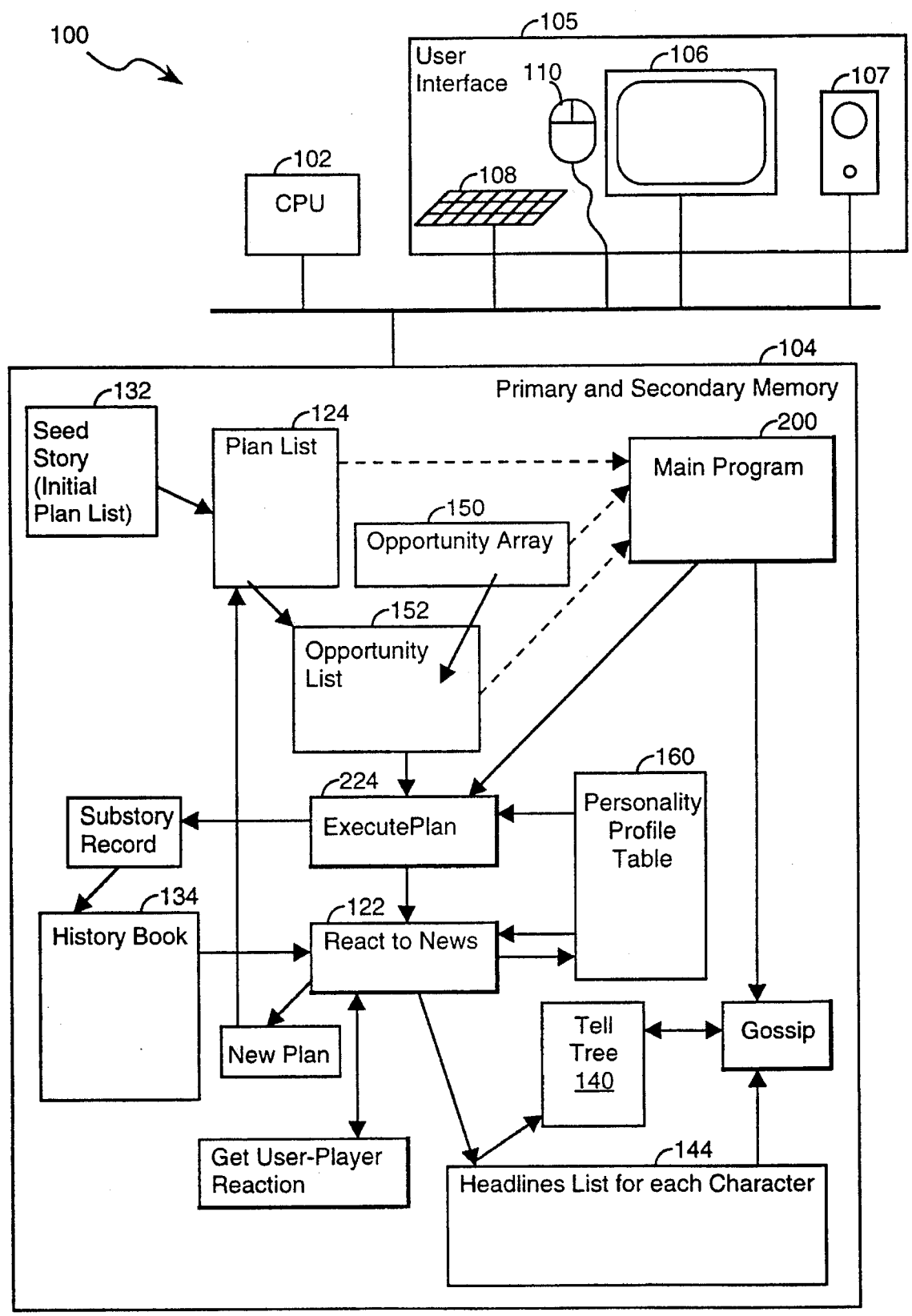
FIG. 1 is a block diagram of a video game incorporating the present invention.

Referring to FIG. 1, there is shown a computer system 100 incorporating a preferred embodiment of the present invention. The system 100 will typically be either an arcade game machine or a desk top computer such as a Macintosh computer made by Apple Computer Inc., or a "PC-compatible" computer such as those made by IBM, Compaq and many other companies. The computer 100 generally includes a CPU 102, primary and secondary memory 104 and a user interface 105 that includes a display 106, audio speaker 107, and one or more user input devices 108, 110 such as a keyboard 108, mouse pointing device 110, joystick (unshown), and push buttons (unshown).

SUBSTORIES AND CHARACTERS

A typical implementation of the present invention will be a video game or other entertainment program that incorporates anywhere from a few dozen to several thousand "substories", which are herein defined to be story fragments. In the Figures, there is no specific data structure representing the actions performed by the substories because, in the preferred embodiment, the substories are implemented as portions of the programs labelled ExecutePlan 120 and ReactToNews 122 in FIG. 1. In other implementations, substories may be implemented by table lookup schemes known to those skilled in the art, with a dictionary of possible "actions" that are referenced by the various substory entries in a substory table.

The entertainment program will typically have two or more "characters" who represent persons and/or other active players in the story line. Some entertainment programs may have dozens of characters, such as entertainment programs with complicated storylines. In other entertainment programs using the invention, there may as little as one character that represents a person or animal or the like, with the other "characters" being parts of the environment that can react and perform actions in reaction to the actions performed by the character.

Most, but not necessarily all, substories have as assignable parameters a subject, a direct object, and sometimes one or more indirect objects. The subject, direct object and indirect objects are ones of the characters. Some substories may have preassigned and unchangeable subjects and direct and indirect objects, such as actions performed by various key characters in a particular storyline. For instance, only the "hero" or "villain" of a story may be allowed to perform certain substories. However, it is anticipated that most substories will have one or more character parameters that can be dynamically assigned during the performance of the entertainment program.

Figure 2:
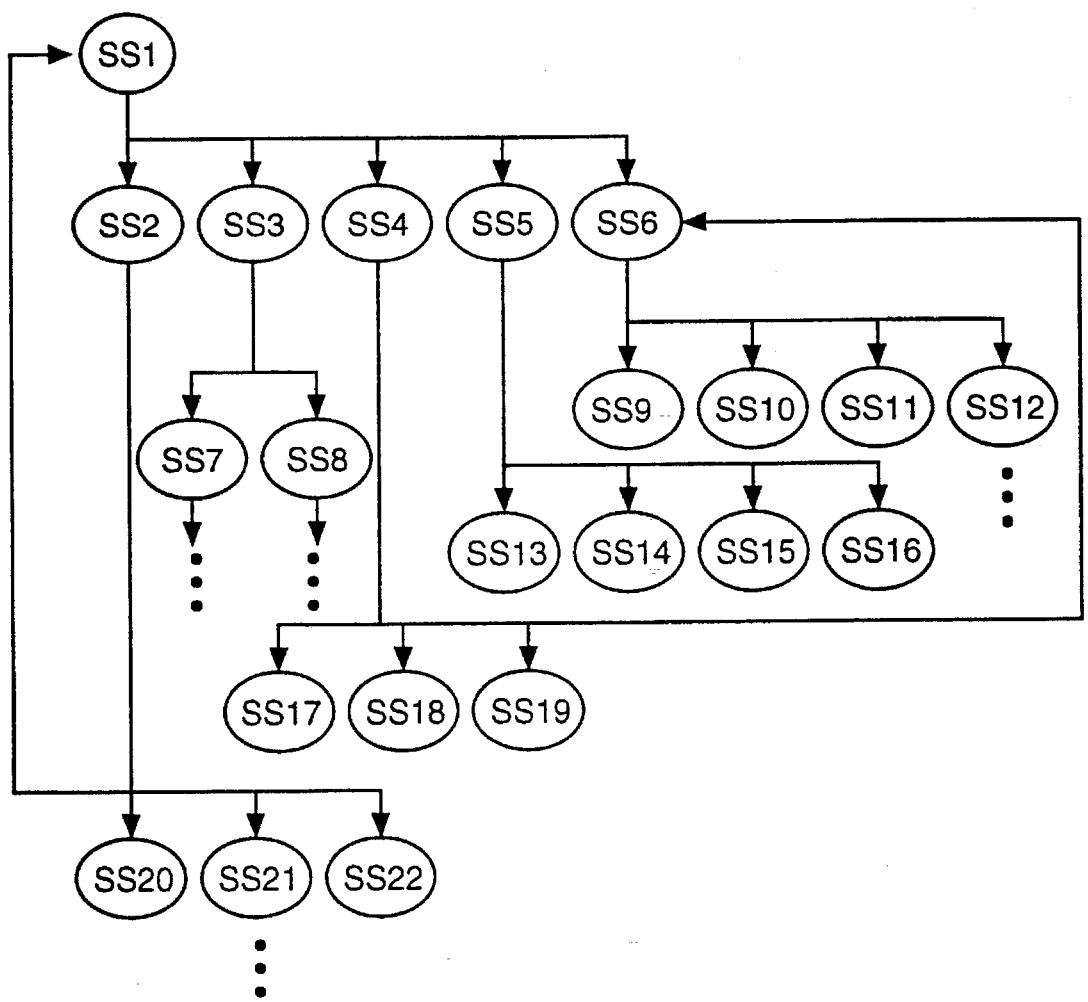
FIG. 2 is a conceptual representation of a matrix of reusable substories.

Referring to FIG. 2, a key aspect of the invention is that most substories are "reusable". In the present context, "reusable" means: (A) that the same substory can be executed with different characters as the subject (i.e., protagonist) of the substory, or (B) that the same substory can be executed with different characters as the direct object (i.e., the character on which an action is performed or the character with respect to which an action is performed), or (C) both A and B. In addition, in those substories having indirect objects, for example when an action is performed on behalf of someone else or when a action is performed that affects more than one character, the indirect objects are almost always dynamically assignable.

As shown in FIG. 2, a directed graph representation of the set of reusable substories and their respective sets of possible reaction substories includes numerous loops (sometimes called loopbacks). As a result, during the execution of a entertainment program using the present invention, each of at least a multiplicity of the substories will be executed a plurality of times with different ones of the characters participating as the subject and object(s) thereof during each execution of each such reused substory.

In FIG. 2, substories SS2–SS6 represent the set of reaction substories that can be selected in reaction to execution of substory SS1. Similarly, substories SS7–SS8 represent the set of reaction substories that can be selected in reaction to execution of substory SS3, substories SS9–SS12 represent the set of reaction substories that can be selected in reaction to execution of substory SS6, substories SS13–SS16 represent the set of reaction substories that can be selected in reaction to execution of substory SS5, substories SS17–SS19 and S6 represent the set of reaction substories that can be selected in reaction to execution of substory SS4, and substories SS20–SS22 and SS1 represent the set of reaction substories that can be selected in reaction to execution of substory SS2. As mentioned above, this "matrix" of substories loops back on itself, and in full implementations such loopbacks are numerous. Loopbacks in the set of available reaction substories does not mean that the user sees the same actions performed multiple times. Rather different sets of the characters will be participants in the actions represented by the substories. Thus instances of substory SS2 may be executed numerous times, but each such instance of substory SS2 may be executed with different characters as the subject and direct object of the substory.

It should be noted that while the subject and direct object of most substories are assignable, there may be limitations on which characters can be assigned to those roles. For instance, the entertainment program may require that the direct object of some substories to be female characters and may limit the subjects or direct objects of various substories to be male characters. Similar possible limitations on the characters who can be assigned the roles of subject, direct object or indirect object are: adult characters, child characters, animal characters, characters who have previously in the storyline witnessed a particular event, characters who have been previously in the storyline have been the direct object or subject of a particular substory, and so on.

Appendices 1–6 contain pseudocode representations of software procedures relevant to the present invention. The pseudocode used in these appendices is, essentially, a computer language using universal computer language conventions. While the pseudocode employed here has been invented solely for the purposes of this description, it is designed to be easily understandable by any computer programmer skilled in the art.

THE PRIMARY DATA STRUCTURES

Figure 3:
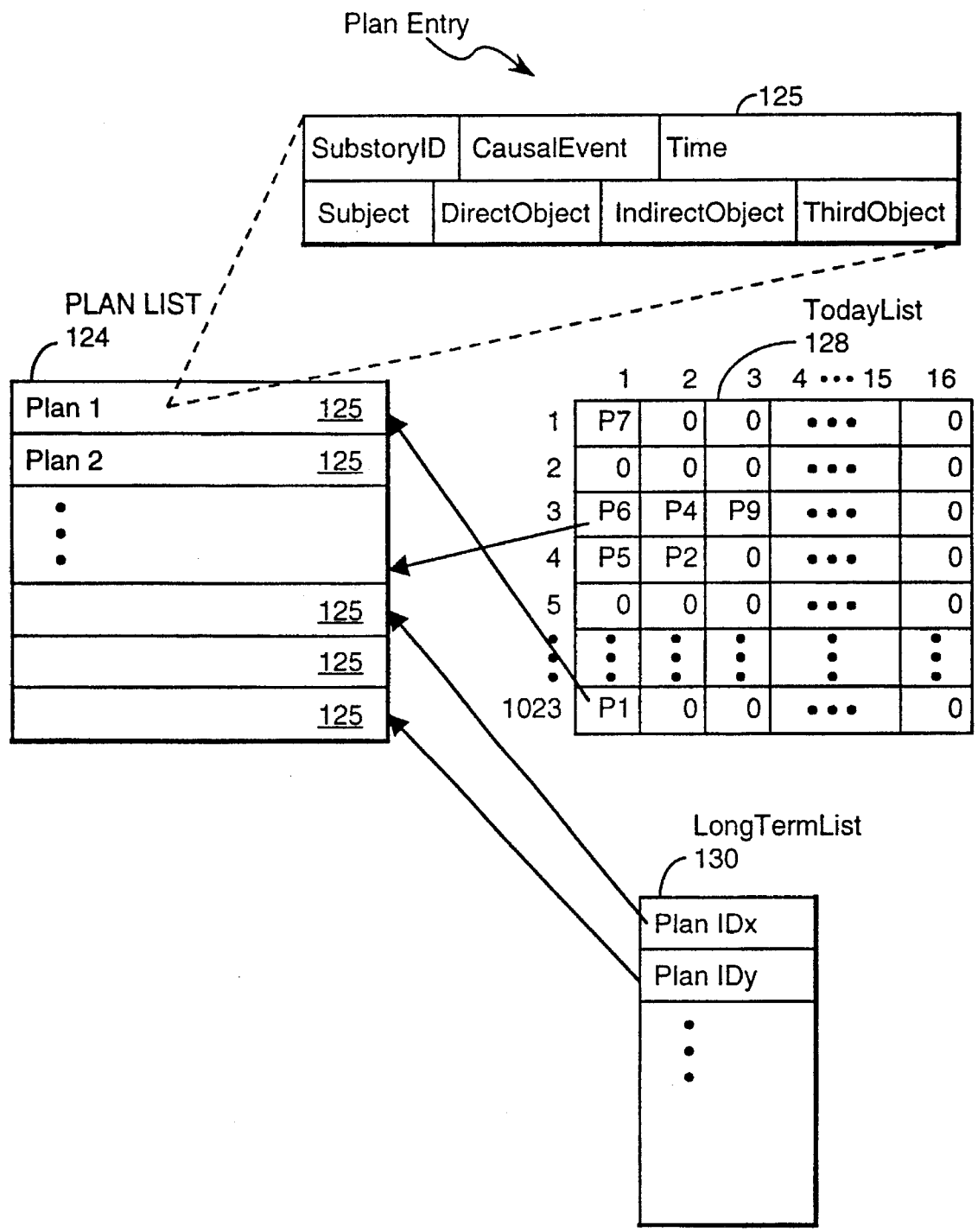
FIG. 3 is a schematic representation of a plan list data structure used in a preferred embodiment the present invention.

Plan List, History Book, Tell Tree, Headlines List, Opportunity Array and List, Personality Profiles, Character Relationship Array Referring to FIGS. 1 and 3, the Plan List 124 is a list of substories that are to be performed in the future. It should be understood that the entertainment program in the preferred embodiment has a scheduler that keeps track of the passage of time in the "simulated world" of the storyline that is being generated by the entertainment program. The Plan List data structure 124 is essentially a set of slots or plan entries 125 for storing substory plans.

Each plan entry 125 (sometimes called simply "plans") includes the following parameters:

- a Substory identifier, indicating the substory to be executed, also herein called the "Substory verb",
- a CausalEvent, indicating which previous event (if any) is the "cause" of the planned event,
- a Time, indicating the earliest time at which the planned event should be performed,
- a Subject, which is the character who is to be the executor or primary actor for the planned event,
- a DirectObject, which is the character who is to be the direct object (e.g., the character at the receiving end of the Subject's actions or a co-actor with the Subject) of the planned event,
- an IndirectObject, which is the character who is to be the indirect object (if any) for the planned event, and
- a ThirdObject, when not given a null value, is usually a thing (such as a gift of other physical object upon which an action is performed), an event in the History Book, or a character who plays a particular role in the planned event. Associated with the Plan List 124 is a TodayList 128 that stores a matrix of pointers to plan entries 125 in time sequence order for all plans that are to be performed within a certain time period in the simulated world called a "day". The amount of real time that it takes for the storyline to progress by one "day" is variable, depending on the number of substories executed for that "day".

A LongTermList 130 stores a list of pointers to plan entries in time sequence order for all plans that are to be performed after the current "day".

The Plan List 124 is garbage collected once per simulated "day" to remove plans that have been executed and to move the remaining plans to the top of the list 124 so that the empty plan entry slots 125 are in a contiguous section of the Plan List data structure 124.

The Seed Story 132 (see FIG. 1) is a set of initial plan entries that are stored in the Plan List 124 when the program is initialized. The Seed Story not only starts the storyline, but can be used to "guide" the generated storyline so as to guarantee that certain event happen during the generated storyline and thus to enable various other substories that may not be accessible except as descendants of the initial plan entries.

In some embodiments more than one Seed Story may be provided. For instance, the entertainment program might be programmed to automatically add an additional seed story to the Plan List 124 whenever no events are planned for a particular length of time or, alternately, whenever the Plan List 124 is entirely empty.

Figure 4:
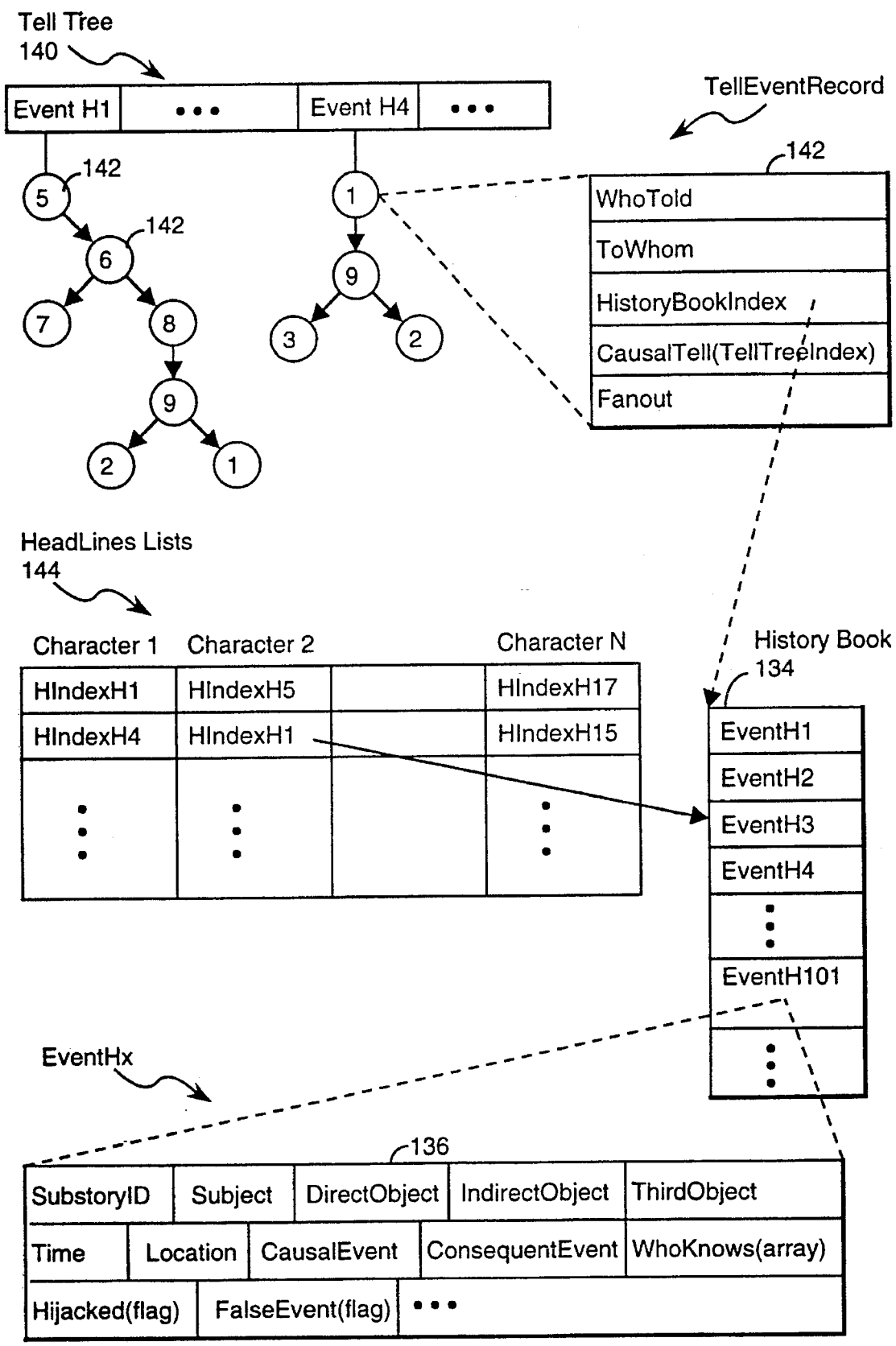
FIG. 4 is a schematic representation of the history book, tell tree and headlines lists data structures used in a preferred embodiment the present invention.

Referring to FIGS. 1 and 4, the History Book 134 is a list of history event entries 136 representing substories that were performed in the past, and thus are "history". In the present invention, historical events can play a larger role than is the case in previous computer generated entertainment programs. For example, in the preferred embodiment, information regarding past events is communicated by allowing the characters to tell each other about such events, and then allowing the recipients of the conveyed information to make plans based on the received information.

Each History book entry 136 includes the following parameters:

- a Substory identifier, indicating the substory that was executed,
- a Subject, which is the character who was the executor of the event,
- a DirectObject, which is the character who is the direct object of the event,
- an IndirectObject, which is the character who is the indirect object (if any) for the event,
- a ThirdObject (if any), which is the object, event or character utilized in the execution of the event,
- a CausalEvent, indicating which previous event (if any) is the "cause" of the event,
- a Time, indicating when the event was performed,
- Location, indicating where the event was performed,
- ConsequentEvent, indicating another History book entry representing the most recent event that happened in response to the event represented by the current history book entry,
- a WhoKnows array of flags (one flag for each of the defined characters), indicating which characters know about this event,
- a Hijacked flag, which is set to true if the event represented by the current history book entry was "hijacked" by an observer of the event (as will be explained below with respect to the "ReactToNews" procedure, and
- a FalseEvent flag, which is set to true if the event represented by the current history book entry did not happen, but has been told by one character to another as a lie.

Tell Tree and Headlines Lists

Referring to FIGS. 1 and 4, the Tell Tree 140 is a set of directed graphs representing who has been told about various events, and indicate who told each person about each such event. For instance, the tell tree 140 shown in FIG. 4 indicates that for event H1, character 5 (who witnessed the event) told character 6, who in turn told characters 7 and 8 of the event. Character 8 then told character 9, who in turn told characters 1 and 2.

Each node 142 of each Tell Tree graph is called Tell Event Record and includes data representing the character (Who-Told) who told another character (ToWhom) of the event corresponding to the directed graph, the History Book index (HistoryBookIndex) indicating where in the History Book 134 the event is stored, the Tell Tree index (TellTreeIndex) of the node's parent node (if any) in the Tell Tree 140, and the Fanout (i.e., the number of characters the WhoTold character has told about the event. Since it is never necessary in the preferred embodiment to trace down the tree, no such pointers are provided.

To prevent the tell tree from becoming excessively large, the contents of the tree are limited to entries necessary to determine the knowledge derivation of events in each character's Headlines List 144.

The Headlines Lists 144 is a list of up to N events (sixteen in the preferred embodiment) for each character. The Headlines List 144 for one character represents the N "most newsworthy" events known to that character. In the preferred embodiment, each substory has an associated "newsworthiness" value called its "import". This import value is adjusted upwards or downwards based on the relationship of the Headlines List's owner's relationship to the subject and direct object of the event. In particular, the substory's nominal import value is increased when the owner of the headline list has a positive affection value for the subject and is further increased when the headline list owner has a positive affection for the direct object of the event; the substory's nominal import value is decreased when the owner of the headline list has a negative affection value for the subject and/or direct object of the event.

Each time a character witnesses an event or is told of an event by another character, a pointer to that's event's record in the History Book 134 is added to the character's Headlines List 144 if (A) there is at least one empty slot in the character's Headlines List 144 and the event meets a minimum newsworthiness threshold, or (B) if the event is of greater newsworthiness than the least newsworthy event currently in the character's Headlines List. In the latter case, the new event displaces the least newsworthy event currently in the character's Headlines List. The new event is inserted into the Headlines List such that all the items in the Headlines List are ordered by their import.

In alternate embodiments, the Headlines List 144 might simply represent the N most recent events of any news value whatsoever that the character knows about.

When an event is displaced from a character's Headline's List 144, if the event is a leaf node in the Tell Tree 140, that leaf node is deleted from the Tell Tree 140. In addition, the deleted node's immediate ancestor node is inspected to see whether (A) ancestor node has no remaining children, and (B) the event is still in the respective characters Headline List. The ancestor node is deleted from the Tell Tree 140 if the node has no children and the event is not in the respective character's Headline List 144. The process of inspecting and deleting ancestor Tell Tree nodes is repeated until all the Tell Tree nodes for the event are deleted or a node is reached that cannot be deleted. If an event displaced from a character's Headline List 144 does not correspond to a leaf node in the Tell Tree 140, the corresponding Tell Tree node is not deleted.

Opportunity Array and List

Figure 5:
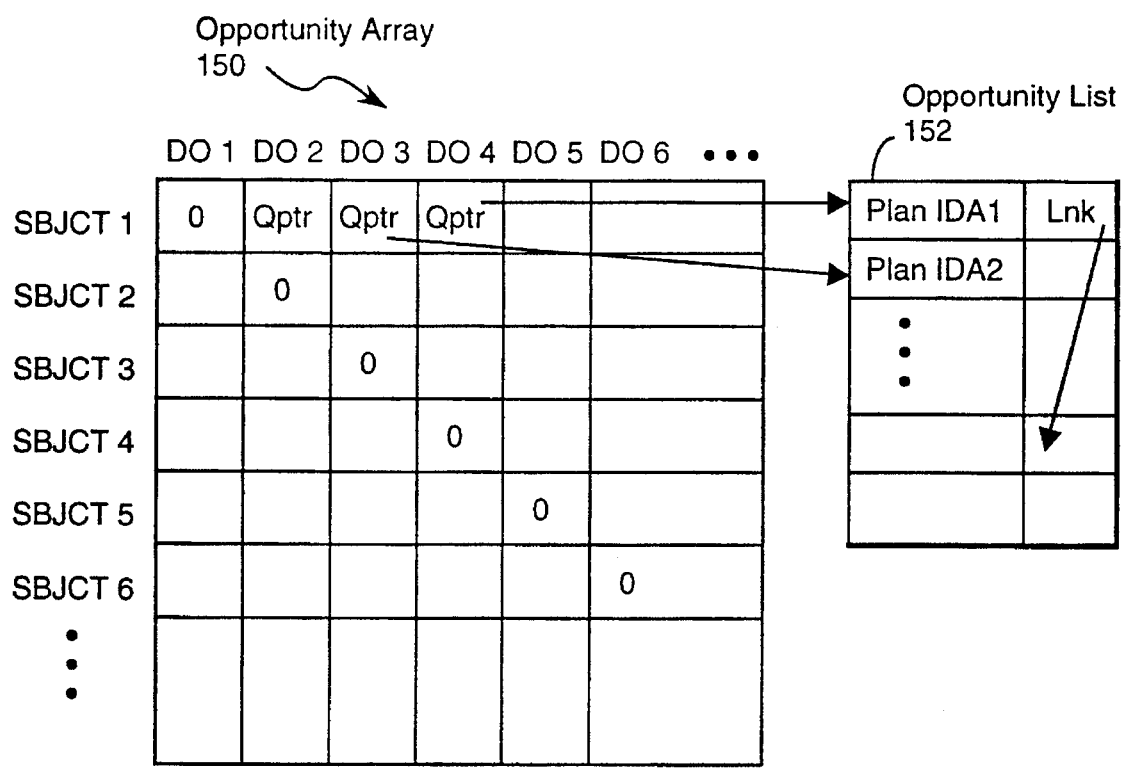
FIG. 5 is a schematic representation of opportunity array and opportunity list data structures used in a preferred embodiment the present invention.

Referring to FIGS. 1 and 5, the Opportunity Array 150 and Opportunity List 152 are data structures used to quickly find plans (i.e., scheduled substories) in which a first specified character is the subject and another specified character is the direct object. More particularly, the Opportunity List 152 stores a set of pointers to those items in the Plan List 124 whose associated scheduled Time has already been reached. Thus the Opportunity List 152 represents all planned substories that are available for immediate execution.

A "character's Opportunity List" is herein defined to mean all the entries in the Opportunity List 152 for which that character is the subject.

The Opportunity Array 150 represents for each possible pairing of two Characters, a pointer to a first item (planned substory) in the Opportunity List 152, if any, for which the first Character is the subject and the second Character is the direct object. A null value is stored in each Opportunity Array entry for which there is no planned substory with the corresponding Subject and Direct Object.

When at least one planned substory is present in the Opportunity List 152 for a particular pair of characters, the corresponding Opportunity Array 150 points to the item in the Opportunity List for that pair of characters with the earliest associated Time value. When there is more than one planned substory in the Opportunity List 152 for a pair of characters, the second parameter of each of the associated items in the Opportunity List is used to form a linked list of the planned substories for the pair of characters.

As will be explained in more detail below, the Opportunity Array 150 and Opportunity List 152 are used as follows. At various times, the various characters in a storyline move from one location to another and a character is selected (e.g., the moved character is selected) and given the opportunity to perform a substory. At this time, all the selected character's entries in the Opportunity Array 150 corresponding to the other characters at the same location are inspected. If at least one of those Opportunity Array entries reference a planned event, then one of the planned events in which the selected character is the subject will be performed. In the preferred embodiment, the planned event with the earliest time value for which the direct object is at the same location as the selected character is the planned event selected for execution.

After a planned event is executed, the executed event is removed from the Plan List and the Opportunity List and the Opportunity Array is updated accordingly.

Personality Profiles

Referring to FIG. 6, the preferred embodiment of the present invention establishes a Personality Profile table 160 for the defined characters. In the preferred embodiment, each character has a personality profile 162 that is defined with respect to sixteen or so parameters, including Location (i.e., where the character is currently positioned), Sex (male or female), Significant Other (the identifier of the character's significant other), OnStage (indicating whether the character is at least potentially available to participate in substory execution), as well as a dozen or so numerically scaled personality traits including Good, Submissive, Empathy, Gullible, Initiative, Volatility, Strength, Lust, Sexiness, and so on. The numerically scaled personality traits have a scale of zero to 100 in the preferred embodiment.

The personality profiles 162 are used during execution of the entertainment program to determine each character's reactions to executed substories, and thus to select what substory each character would most likely select as a reaction to the event (i.e., executed substory). More particularly, for each substory there are (A) a set of possible consequent substories, and (B) a corresponding set of "reaction formulas" that are used to determine the weight of each possible consequent substory with respect to each possible subject of those consequent substories. The set of possible subjects of the consequent substories is generally the witnesses of the event (the characters at the same location other than the subject and direct object of the event), the direct object of the event, and the subject of the event. The weights of all the possible substories for all the possible subjects are evaluated, and one or more are selected to be planned events in accordance with predefined planned substory selection criteria that will be discussed below.

Another aspect of the personalities of the characters that is not represented in the personality profile table 160 are pairwise relationships between the various characters. These pairwise relationships are represented by data stored in a relationship table 164 for each of the defined characters. For instance, as shown in FIG. 7, in the preferred embodiment, for every possible pairing of characters, the following numerically scaled relationship parameters are defined: Dominance, Affection, Trust and Loquaciousness, which are each scaled within a range of −100 to +100. For instance an Affection value of 90 indicates a very strong feeling of affection by one character for another, while an Affection value of −30 indicates mild dislike. Note that Dominance values between characters are not necessarily reciprocal, although they are often close to being reciprocal, while Affection values are often not matched (i.e., character A may like or dislike character B more than the character B likes or dislikes character A).

In addition, the type of Relationship between characters is defined by a Relationship parameter. The interpretation of the Relationship parameter depends on whether or not the two characters are of different or the same sex. In particular, a Relationship parameter equal to 0 indicates no special relationship, 1 indicates "dating" (different sex) or a friend (same sex), 2 indicates lovers (if different sex) or "blood-brothers" (same sex), and 3 indicates married (if different sex) or "co-conspirators" (same sex). Finally, a boolean flag labelled BloodTie is provided for each pair of characters to indicate if the two characters are blood relatives.

Substory Parameter Table

Referring to FIG. 8, each of the defined substories is assigned certain parameter values (stored in Substory Parameter Table 170) that affect how the substories are selected and executed. In the preferred embodiment, those parameters are as follows:

A) Time to Prepare: the minimum amount of time that must pass from the time a "character forms a plan" to the time that the substory is actually executed.

B) Time to Execute: the amount of storyline time used by execution of a substory.

C) Import: this parameters indicates the newsworthiness of a substory. Higher values indicate greater newsworthiness. The import value is used to determine which events to include in the various characters' Headlines lists, with events of greatest newsworthiness being placed highest in the Headlines lists.

D) Audience: a value of 0 (NoAudience) indicates an event that nobody other than the Subject can witness (e.g., a mental event), a value of 1 (AnyAudience) indicates this event has no special audience requirements and can be witnessed by anyone without restriction, a value of 2 (PositiveAudience) indicates an event for which there must be an audience (e.g., an event involving a boast), a value of 3 or 4 (PrivateAudience) indicates a crime or the like that is intended to be private (e.g., to be witnessed only by the Subject and Direct object of the event), a value of 5 (ExcludeIndObjAudience) is a event that must not be witnessed by a specific character (the Indirect Object of the event), and a value of 6 (AllAudience) indicates an event that is known to everyone instantly.

E) Expression: is an indirect reference to the procedure for generating the video sequence associated with this event. In the preferred embodiment, this is a single reference to a particular video action sequence procedure. In alternate embodiments, several parameters might be required to define the video images and/or audio sounds to be generated while a particular planned event (i.e., substory) is executed.

Storyline Execution Method

Figure 9:
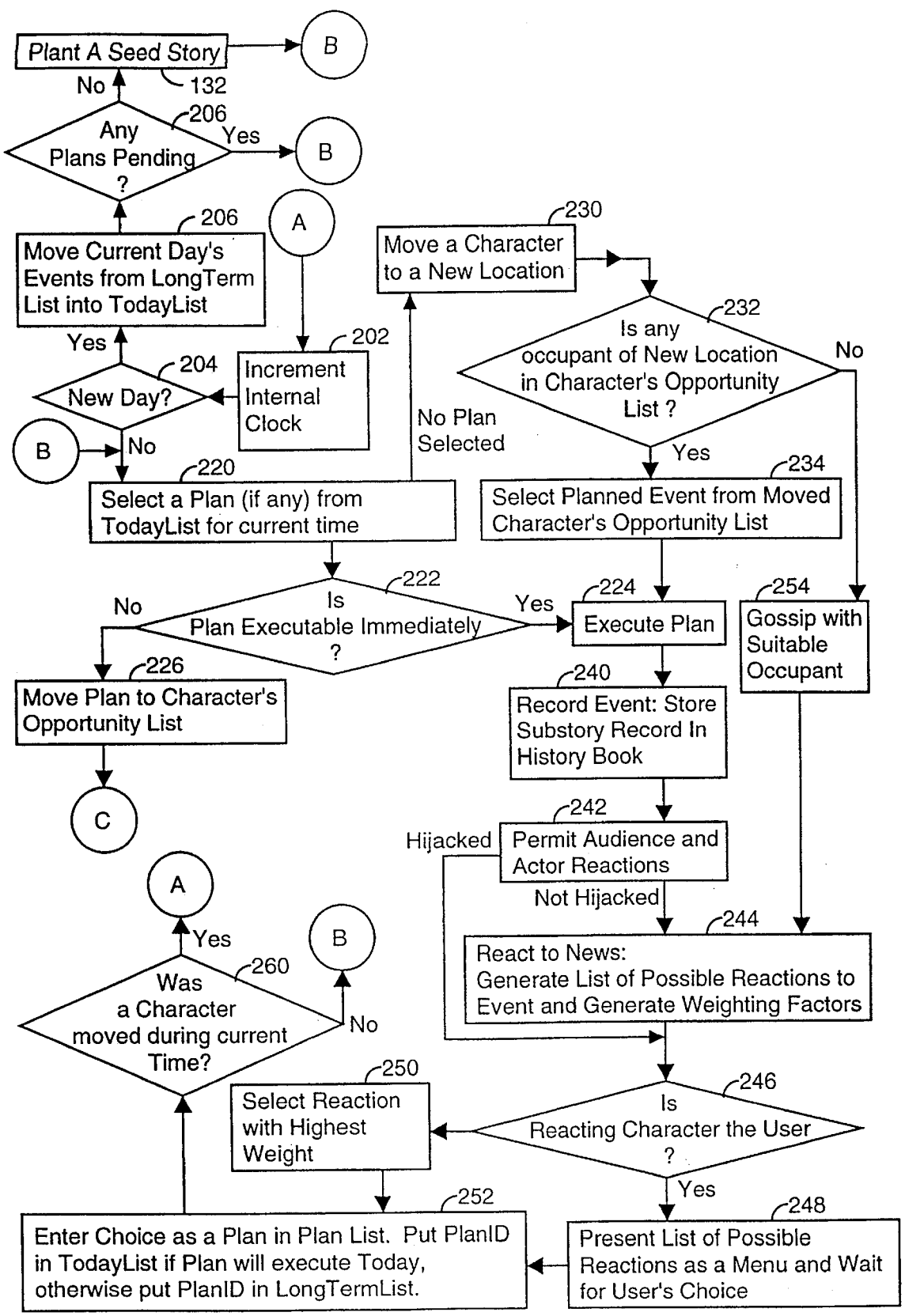
FIG. 9 is a top level flow chart of a preferred embodiment of video game software incorporating the present invention.

Referring to FIG. 9 depicts a flow chart of the method by which a storyline is generated in the preferred embodiment of the present invention. Appendices 1 through 6 contain pseudocode representations of some of the most relevant portions of the preferred embodiment. Prior to generation of a storyline the user will select or be assigned control of one of the characters in the storyline. Any time that the user's character is called upon to react to an event witnessed by the user's character, to react to news of an event not witnessed by the user's character, or to otherwise make a plan to perform an action (i.e., to select a substory to perform), the user is asked to select a plan from a set of possible reaction plans.

A master clock loop in the system's main program 200 (see Appendix 1) keeps track of the passage of time in the simulated world of the storyline being generated. In the preferred embodiment, each "day" in the simulated world of the storyline has 1024 time units, each equivalent to about one minute (with about 7 hours in each 24-hour day being skipped). The internal clock of the master clock loop in incremented (step 202) in steps of one time unit, and for each time unit the following steps are performed.

First, if the new time value represents a new day (step 204), the TodayList 128 is cleared and then the planned events in the LongTermList 130 for the current day are moved into the TodayList 128 (step 206). Then the main scheduler checks to see if no plans are pending (step 208) for all time. If no plans are pending, a "seed story" is planted (step 210) by storing a single seed event (or alternately a set of seed events) in the Plan List and a pointer to that plan in the TodayList 128. Then normal operation of the system resumes with step 220.

At step 220 the main program looks to see there are any plans in the TodayList with a scheduled Time equal to or before the current time. If there is at least one such plan, the first or earliest such plan listed in the TodayList is selected (step 220). The selected plan is then checked to see if it is executable immediately (step 222). A plan is executable immediately if and only if (A) the subject and direct object (if the plan has a direct object) are at the same location, or (B) the plan has a subject but does not have a direct object. If the selected plan is executable immediately, the planned substory is executed (step 224). If the selected plan is not executable immediately, the selected plan is added to the Opportunity List 152 for the subject of the planned substory (step 226).

A plan is "added to the Opportunity List" by adding an entry referencing the planned substory to the Opportunity List 152. Furthermore, if the slot of the Opportunity Array 150 corresponding to the planned substory's subject and direct object is empty, a pointer to the new opportunity list entry is inserted into that slot of the Opportunity Array 150. If that slot of the Opportunity Array 150 is not empty, a pointer to the new opportunity list entry is added to the last opportunity list entry in the Opportunity List 152 corresponding to the planned substory's subject and direct object.

All the plans for the current time that are currently executable are executed, as will be described below in more detail. In addition, every M time units (e.g., every 4 time units in a preferred embodiment), the main program performs step 230. At step 230 the main program moves a selected character to a new location. In the preferred embodiment, when there are N characters in a storyline, each of characters has a unique assigned character identifier (Character ID) between 1 and N, and each character is moved to a new location once every N time units. In particular, each character is moved when (current time modulo *M*)+1=Character ID where "Character ID" is the character's character identifier. Other mechanisms for determining when to move characters to new locations can be used in alternate embodiments. The MoveCharacter procedure is shown in more detail in Appendix 2.

In the preferred embodiment, step 230 is performed as follows: the planned events referenced by the opportunity array for the character to be moved are checked until a planned event is found that can be executed immediately. This typically requires that all the required participants other than the Subject must be located at a single location and that the required characters not be "occupied" by another event that is being executed. If any such immediately executable plan is found, then the character to be moved is moved to the location of the direct object for the planned event. If no such immediately executable plan is found in the opportunity array, then the selected character is moved to a randomly selected location.

At step 232 the main program determines if any occupant of the moved character's new location is the direct object of a plan in the moved character's Opportunity List. If so, a planned event is selected from the moved character's opportunity set (step 234) which is immediately executable (i.e., all the required characters for the planned substory are present and are not occupied by the execution of any other event). The substory corresponding to the selected plan is then executed (step 224).

The Substory Execution step 224 may or may not result in anything corresponding to the executed substory being displayed on the system's display device 106, depending on the implementation of the invention. In one preferred embodiment, the user only learns of executed substories when the character being played by the user is asked to react to events observed by that character or is asked to react to another character telling the user's character of a particularly newsworthy event. In a second preferred embodiment the execution of the event is played out of the display device 106 for the user to see. Furthermore, in preferred embodiments of the invention, many, if not all, executed events will generate audio outputs such as words spoken by the characters as well as sound effects and music relating the actions performed when a substory is executed.

The execution of a planned substory generates an event record 136 that is stored in the history book 134 as an history event entry (step 240). The structure and contents of the history book were previously discussed with respect to FIG. 4. When an executed event is stored in the history book, the "WhoKnows" flags for all Witnesses and Participants in the event are set to True. In this way the system executing the entertainment program can determine which characters already know about the executed event. The ExecuteEvent procedure is shown in more detail in Appendix 3.

React To News

After a substory is executed and a record of the event is stored in the history book, witnesses to the event (including the direct object and the subject of the event) are given the opportunity to react to the event at steps 242 and 244. In particular, a ReactToNews procedure is executed first for each of the non-participating witnesses, then the ReactToNews procedure is executed for the direct object and finally for the subject of the executed substory. The React- ToNews procedure can generate a single reaction plan for each such witness, direct object and subject. Thus, a single executed event can potentially result in the generation of many reaction plans.

In the preferred embodiment, each witness can generate only one such reaction plan, but this limitation is circumvented through the use of "chained events". A set of "chained events" is a set of substories where the execution of a first certain substory always results in the subject of the executed substory making a plan to execute a corresponding second substory. In other words, calling the "ReactToNews" procedure after execution of the first reaction substory results in the generation of a plan which has the same subject as the first reaction substory. In some cases, execution of the second substory always results in the subject of the executed substory "making a plan" (i.e., in the ReactToNews procedure generating a plan) to execute a corresponding third substory, and so on.

The first step of the ReactToNews procedure is to allow the reacting character to have an "emotional reaction" to the event which was just executed, or the event which the character just learned about from another character, by calling the EmotionalReaction procedure, and the second step is to formulate either zero or one reaction plans in reaction to the event.

The EmotionalReaction procedure updates the personality profile of the character reacting to a past event. Table 1 shows an example of a typical personality profile adjustment. In that example, "SubstoryData" refers to the Substory Parameter Table 170, "Personality[Who]" refers to the personality profile of the character whose personality profile is being adjusted, the variables "ChangeInXX" represent an amount used for adjusting personality profile parameters XX, where XX is any of the first four inter-personal relationship parameters in the Relationship Table 164 of the character whose personality profile is being adjusted. The AdjustAffection, AdjustDominance and other Adjust . . . procedures are the procedures which update the Personality Profile Tables 164. Appendix 4 contains a more detailed pseudocode representation of the Emotional Reaction procedures.

TABLE 1

Example of Steps Performed by EmotionalReaction Procedure
When One Character Reacts to a Previously Executed Event

```
Compute Personality Changes:
  ChangeInDominanceSubject =
    -SubstoryData[SubstoryVerb].Import DIV 8
  ChangeInAffectionIndObject =
    -Personality[Who].Trust[Subject] DIV 8
  IF Who = DirObject Then
    ChangeInAffectionSubject = 8
Store Computed Changes in Personality Profile Tables:
  If ChangeInAffectionSubject ≠ 0 Then
    AdjustAffection(Who, Subject,
      ChangeInAffectionSubject)
  If ChangeInDominanceSubject ≠ 0 Then
    AdjustDominance(Who, Subject,
      ChangeInDominanceSubject)
  If ChangeInAffectionDirObject ≠ 0 Then
    AdjustAffection(Who, DirObject,
      ChangeInAffectionDirObject)
  If ChangeInDominanceSubject ≠ 0 Then
    AdjustDominance(Who, DirObject,
      ChangeInDominanceDirObject)
  If ChangeInAffectionIndObject ≠ 0 Then
    AdjustAffection(Who, IndObject,
      ChangeInAffectionIndObject)
  If ChangeInDominanceIndObject ≠ 0 Then
```

TABLE 1-continued

Example of Steps Performed by EmotionalReaction Procedure
When One Character Reacts to a Previously Executed Event

```
    AdjustDominance(Who, IndObject,
      ChangeInDominanceIndObject)
  If ChangeInTrustSubject ≠ 0 Then
    AdjustTrust(Who, Subject, ChangeInTrustSubject)
  If ChangeInTrustIndObject ≠ 0 Then
    AdjustTrust(Who, IndObject, ChangeInTrustIndObject)
```

The second step of the ReactToNews procedure, is to generate either zero or one new plans for the reacting character.

As mentioned earlier, each substory in the matrix of defined substories has a predefined set of possible reaction substories. In some cases, the set of available reaction substories will be different for the subject, direct object, and other witnesses. In the preferred embodiment, the ReactToNews procedure is called once for each witness. To select a reaction plan, the ReactToNews first stores identifiers for the set of possible reaction plans. For example, in an example from the preferred embodiment a set of five possible reaction plans is indicated as follows:

Result[1]=ColdGreeting

Result[2]=SuspiciousGreeting

Result[3]=DominantGreeting

Result[4]=FormalGreeting

Result[5]=LukewarmGreeting

Then "weights" are computed for the set of possible reaction plans. In the preferred embodiment, two methods are used to compute such weights. In one method, the weight for each possible reaction plan is individually computed. For example:

```
Weight[1] := 20 - Personality[Who].Affection[LSubject]
Weight[2] := -10 - Personality[Who].Trust[LSubject]
Weight[3] := Personality[Who].Dominance[LSubject]
Weight[4] := 10
IF Affection[LSubject] < 30 THEN
  Weight[5] := 2 * Personality[Who].Affection[LSubject]
ELSE
  Weight[5] := 0
END
``` where "Personality[Who].Affection[LSubject]" is the value in the Relationship Table 164 of the character that is reacting to the execution of a substory, representing the reacting character's Affection for the subject of the executed substory, "Personality[Who].Trust[LSubject]" represents the reacting character's Trust in the subject of the executed substory, and "Personality[Who].Dominance[LSubject]" represents the reacting character's Dominance over the subject of the executed substory. The weight computation formulas can utilize any personality characteristics represented in the relationship tables 164, the personality profile table, as well as information in the history book.

As indicated above, the selection of a reaction to an event can be based on whether the reacting character has already performed a particular substory. An example of such a selection method, where X is the subject of the event being reacted to, is as follows:

```
Result[1] = TellOff
Result[2] = SlapFace
Result[3] = PlanRevenge
Found1 = Search HistoryBook for Event with Who as Subject,
    X as DirObject and SubstoryVerb=TellOff
Found2 = Search HistoryBook for Event with Who as Subject,
    X as DirObject and SubstoryVerb=SlapFace
IF Found1 & Found2 THEN
    Weight[3] = 100
ELSE IF Found1
    Weight[2] = 100
ELSE
    Weight[1] = 100
END
```

In the above example, the ReactToNews procedure generates a plan for the reacting character, Who, to perform the PlanRevenge substory if in past events the reacting character has already performed the TellOff and SlapFace events with X as a direct object. If in past events the reacting character has already performed the TellOff event but not the SlapFace event, the ReactToNews procedure generates a plan for the reacting character to perform the SlapFace event. Otherwise, the ReactToNews procedure generates a plan for the reacting character to perform the TellOff event.

The second method of computing weights for the set of possible reaction substories is (A) to compute a single "plan selector" value, (B) to determine which integer K between 1 and N, inclusive, is closest to the computed selector value, where N is the number of possible reaction substories, and (C) to then assign the highest possible weight to Weight[K] while assigning the other weights values of zero.

In both cases, after weights are computed for the possible reaction substories, unless the reacting character is the one being played by the end user (step 246), the reaction substory with the highest weight is selected (step 250). If the highest weight is equal to zero, no plan is generated in reaction to the executed substory for the character for whom the ReactToNews procedure was called. Otherwise, when the highest weight is greater than zero, a plan is generated corresponding to the reaction substory with the highest weight. In the generated plan, the reacting character is denoted as the subject of the planned substory, the subject of the "causal substory" (i.e., the substory which is being reacted to) is usually denoted as being the direct object of the planned substory. The time associated with the plan is set equal to the current time in the simulated world, plus the "Time to Prepare" value associated with the planned substory (see FIG. 8). More details on the process of generating a plan are found in Appendix 5.

The ReactToNews procedure can be selectively configured (by the author of each particular entertainment program utilizing the present invention) for each type of executed event to not make reaction plans for various classes of characters simply by comparing the identity of the character for whom the ReactToPlans procedure is being executed against planning enablement criteria associated with the prior event to which the character is reacting, and then not generating a plan for any character not meeting the planning enablement criteria. In many cases, none of the witnesses (other than the prior events participants) will generate a reaction plan having a nonzero weight.

If the reaction plan generated for any witness has an associated execution time that is "immediate" (e.g., less than 3 time units in the future, in the preferred embodiment) then the storyline associated with the just executed substory is said to be "hijacked" by that witness, and the Hijacked flag in the History Book entry for the executed substory is set to True. Once the Hijacked flag for a previously executed event is set to True, none of the other witnesses other than the subject of the event is allowed to generate any further reaction plans to that event. However, even after an event is "hijacked", the Personality Profile of each of the witnesses is still updated by calling the EmotionalReaction procedure for each of the event's witnesses.

If the direct object of the last executed substory is the character controlled by the user (step 246), then the user is presented with a list of possible reactions and then the system waits for the user's selection (step 248). Otherwise, the reaction plan assigned the highest weight in step 244 is selected (step 250). The selection reaction plan is then added to the Plan List 124 (step 252). The scheduled execution time for the selected reaction time is set equal to the current time plus the "Time to Prepare" value associated with the selected substory (see FIG. 8).

It is noted here that in the preferred embodiment, for some events the set of possible reaction substories is to formulate a lie (i.e., a false historical event) and to store that lie in the history book. The "lie" is not "executed" as an event, but is stored in the History Book and in the Headlines List of the character whose selected reaction plan was to formulate the lie. That lie is then told to other characters when this character "gossips" with other characters (step 254, discussed below) and then those characters tell other characters. "Lies" generally are assigned high newsworthiness values, and thus tend to have a relatively high likelihood of being retold to other characters.

In addition, the ReactToNews procedure includes special provisions for reacting to gossip which is a lie. In particular, the ReactToNews procedure can be configured to determine if the recipient knows that the received gossip is a lie by searching whether the recipient knows about the lie's causal event (i.e., the event which liar reacted to be generating a lie). In that case, the ReactToNews procedure can be configured so as to formulate a plan for the recipient of the fallacious news to confront or otherwise hurt the character that generated the lie.

More details on the ReactToNews and EmotionalReaction procedures are shown in Appendices 4 and 5.

Main Program After Executing ReactToNews

If the end user is the character reacting to an event, or news of an event (step 246), the user selects the reaction substory to be entered into the Plan List. Otherwise, at step 250, the main program selects the one of the possible reaction substories having the highest computed weight.

At step 260 the main program determines whether a character was moved during at current time. Note that it is possible to reach this point in the storyline generation process by executing a previously made plan, without having yet moved a character. If this is the case, the main program resumes execution at step 220. Otherwise the main program resumes execution at step 202.

Gossip: Communicating News of Past Events

As described above, at step 232 the main program determines if any occupant of the moved character's new location is the direct object of a plan in the moved character's Opportunity List. If not, the moved character "gossips" with a suitable occupant of the moved character's location (step 254).

In particular, a gossip procedure (see Appendix 6) selects the character at the same location as the moved character towards whom the moved character has the highest loquaciousness value (see Relationship Table 164 in FIG. 7).

Then the gossip procedure compares the headlines list for the moved character with the selected character, and in particular selects the highest item in the moved character's headlines list 144 (FIG. 4) that is not already known by the selected character. In addition, the gossip procedure prevents the selection of any headlines item if telling the selected character about the headlines item would be adverse to the telling character's best interests. This determination is made by calling the EmotionalReaction procedure with the "VirtualReaction" flag set to True, causing the EmotionalReaction procedure to generate three parameters: FlattersSubject, FlattersDirObject, and FlattersIndObject:

EmotionalReaction (z, Who, VirtualReaction=True, FlattersSubject, FlattersDirObject, FlattersIndObject)

where "Who" is the moved character and z is the history book index of the candidate event in the moved character's headlines list.

Next, the gossip procedure determines whether a item is "good gossip" by computing a value called GoodGossip:

```
z = History Book Index for the candidate event in the headlines list
OldS = History[z].Subject
OldD = History[z].DirObject
OldI = History[z].IndObject
GoodGossip = FlattersSubject × Personality[Who].Affection[OldS] +
    FlattersDirObject × Personality[Who].Affection[OldD]
IF (OldI's value indicates the event had an indirect object) THEN
    GoodGossip = GoodGossip +
        FlattersIndObject × Personality[Who].Affection[OldI]
```

The GoodGossip parameter is built from components relating to the subject, direct object and indirect object (if any) of the candidate event. Each component will be a positive value if the candidate event flatters that character and the moved character has a positive Affection value for that character, or if the candidate event does not flatter the subject (i.e., has a negative "flatters" value) and the moved character has a negative Affection value for that character. If the GoodGossip value is positive, telling the headlines item to other characters is not adverse to the moved character's interests, and thus a plan to perform the "TellNews" substory is generated and stored in the Plan List:

```
IF GoodGossip > 0
    Generate Plan to perform TellNews substory with selected
        character as the subject and the candidate event as the
        third object.
```

Furthermore, the Gossip procedure prevents the telling of a headlines item to the selected character when the headlines item represents fallacious events allegedly involving the selected character.

If any headlines item exists that meets the above discussed selection criteria, that headlines item is selected and then the Gossip procedure generates a plan (with a specified preferred execution time equal to the next available time value) to immediately perform the "TellNews" substory with the moved character as the subject, the selected character as the direct object, and the event corresponding to the selected headlines list item as the third object of the planned event:

```
Plan.Verb = TellNews {Substory identifier for planned Substory}
Plan.Subject = Moved Character
Plan.DirObject = Character to whom news is to be told
Plan.ThirdObject = History Book Index for the news event
Plan.Time = Current Time + 1.
```

When the planned TellNews substory is executed (step 244), the following steps are performed. The ExecuteEvent procedure first calls a procedure called BuildTale, which traces through the History Book and builds a list called the "Tale" of all events which are the causal events of the news event to be told to the direct object. The BuildTale procedure excludes from the Tale events not known to the character who is the subject of the planned TellNews substory and also excludes events already known to the specified recipient.

Each event recorded in the History Book includes a CausalEvent parameter, which is a pointer to a previous event (if any) that is the recorded event's causal event. Using the CausalEvent parameters in the History Book, each such causal event is added to the Tale list until a zero CausalEvent value is found, indicating an event with no known causal event. In addition, each event recorded the History Book includes a ConsequentEvent parameter, which is a pointer to an event (if any) that resulted from a reaction to the recorded event. Using the ConsequentEvent parameters in the History Book, each such consequent event is added to the Tale list until a zero ConsequentEvent value is found, indicating an event with no known consequent event.

After the Tale list has been built, each event in the Tale is communicated to the specified recipient. The events in the Tale are communicated to the specified recipient in the same sequence that they occurred. The WhoKnows flag corresponding to the recipient for the communicated event is set, and the ReactToNews procedure is called for each such event communicated to the recipient to give the recipient the opportunity to generate an emotional reaction (i.e., to revise that character's relationship table) and to possibly generate a reaction plan (step 244). Furthermore, the most newsworthy of the communicated events are entered into the recipient's headlines list and the Tell Tree 140 is updated accordingly.

As explained above, the ReactToNews procedure evaluates all possible reaction substories that the recipient of the gossip could select by computing functions associated with each of the possible substories. The functions generally are computations based on the character profiles of the character reacting to the news of an event.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

- 36 -

APPENDIX 1
MAIN PROGRAM

```
       Minute = 0
 5     Gameday = 1
       Initialize all arrays
       Store initial set of seed story events in the PlanList
       Newday (initializes TodayList)

10     REPEAT (FOREVER, more or less)
          Gameclock = 1024 x (Gameday -1)
          While Minute ≤ 1023
             If at least one event is planned for the current time
                BEGIN
15                REPEAT for each event planned for the current time
                     J = (ptr to next planned event for current time in
                           TodayList)
                     Check event J to see if can be executed (i.e., are
                           all required participants at the same location,
20                         and are those participants not otherwise
                           occupied)
                     If Event J is executable
                        ExecuteEvent (J)  (See Appendix 3)
                     Else
25                      BEGIN
                           SJ = Subject of Event J
                           DO = Direct Object of Event J
                           Add Event J to the Opportunity List
                           If the corresponding Opportunity Array slot is
30                         blank (i.e., Opportunity Array(SJ,DO)=0 )
                              Add pointer at Opportunity Array(SJ,DO) to
                              the Opportunity List slot for Event J
                           Else
                              Link the Opportunity List slot for Event J
35                            to the last plan in the Opportunity List for
                              the (SJ,DO) pair of characters.
                        END
                     END
                END Repeat (event loop)
40
             If (Minute MOD 4) = 0
                Call MoveCharacter(Minute)
```

- 37 -

```
         Minute = Minute + 1
         GameClock = GameClock + 1
      END {WHILE Minute Loop}

5     If Game Termination Conditions Are Met
         Terminate Game

NewDay  {Moves planned events for next day into the
               TodayList, Garbage collects the PlanList, Stores
10             another seed story in the PlanList if the Plan
               List is empty, etc.}
   END {day loop}
```

- 38 -

APPENDIX 2

MOVECHARACTER PROCEDURE

```
     Procedure: MoveCharacter
 5   {Select Character to Move:}
     Who = (Minute DIV 4) MOD CharacterCount + 1
     If Who is not already occupied by another event
        Scan First Item in Who's Opportunity Array For each other
           Character to determine if that Item represents a Planned
10         Event that can be executed (i.e., all required
           participants are at the same location, and those
           participants are not otherwise occupied).
        Select the first such Event found.
     If an Executable Event is found
15      J = (ptr to selected event)
        Move Who to the location of the direct object of the
           selected event.
        ExecuteEvent (J)
     Else
20      Move Who to a randomly selected location (Z)
        Scan All Items in Who's Opportunity Array for each other
           Character that is located at location Z to determine
           if any such Item represents a Planned Event that can
           be executed (i.e., all required participants are at
25         the same location, and those participants are not
           otherwise occupied).
        Select the first such Event found.
        If an Executable Event is found
           J = (ptr to selected event)
30         ExecuteEvent (J)
        Else
           Call Gossip (Who, Z)
        END
     END
35   END
     RETURN
```

- 39 -

APPENDIX 3
EXECUTE EVENT PROCEDURE

```
    Procedure: ExecuteEvent (J)
 5  {This Procedure Executes an Event, Lets the appropriate
    characters React to the event by creating plans for new
    events, and Records the executed event in the History Book.}

Subject, DirObj and ThirdObj = Subject, Direct Object and
10      Third Object of event J If Event = TellNews
    {When the executed event is a TellNews event in which one
    character telling another character about a prior event, the
15  BuildTale procedure reviews the HistoryBook and creates a
    list called the "Tale" of all the related events, and then
    the Direct Object of the TellNews event is allowed to react
    to each of the events in the Tale.}
        Generate associated video images and audio output, if any.
20      Call BuildTale
        For each event in Tale
            {If DirObj's Headlines List has an empty Slot OR (event
            is more newsworthy than the least newsworthy event in
            DirObj's Headlines List, put event in DirObj's Headlines
25          List}
            Call EnterTale (event, DirObj)
            Call ReactToNews (Event, DirObj)
        End 30  Else {regular event}
        Generate video images and audio output associated with
        execution of event J.
        Record Event J in History Book
        Set "WhoKnows" flags to True for all Witnesses and
35          Participants in the Event
        {Witness Loop}
        For each witness to the event (excluding Subject and
            DirObj)
            If NOT Event.Hijacked
40              Call ReactToNews (Event, Witness)
            If Witness ≠ Arthur
                Call EmotionalReaction(Event, Witness)
```

- 40 -

```
      END {Witness loop}

If NOT Event.Hijacked
         Call ReactToNews (Event, DirObj)
 5    If Witness ≠ Arthur
         Call EmotionalReaction(Event, DirObj)
      End {ReactToNews is called for Subject to implement Multi-Event
10    reactions to prior events, in which each executed event
      causes the Subject to then plan to execute the next event in
      the sequence.}
      Call ReactToNews (Event, Subject)

15    Store Record of Executed Event in HistoryBook
      Mark the Executed Event's participants as occupied for
         period of time equal to Event.TimeToExecute If Recorded Event "Creates a Lie"
20       Store the Lie as an event in the History Book
         Mark the New Event as Fallacious
      {Note:  The WhoKnows flag for the Character who "created"
              the lie was previously set.}
      RETURN
```

- 41 -

APPENDIX 4

EMOTIONAL REACTION PROCEDURES

```
    Procedure: EmotionalReaction (Substory, Who,
 5     VirtualReaction, FlattersSubject, FlattersDirObject,
       FlattersIndObject)

LSubject = Substory.Subject
    LDirObject = Substory.DirObject
10  LIndObject = Substory.IndObject
    Verb = Substory.Verb      {Substory Identifier}

ChangeInAffectionSubject   = 0
    ChangeInDominanceSubject   = 0
15  ChangeInAffectionDirObject = 0
    ChangeInDominanceDirObject = 0
    ChangeInAffectionIndObject = 0
    ChangeInDominanceIndObject = 0
    Case Verb
20    AcceptApology:
        Begin
        ChangeInDominanceSubject =
          -Personality[Who].Dominance[LDirObject] DIV 8
        ChangeInAffectionSubject =
25        -Personality[Who].Dominance[LDirObject] DIV 8
        End
      ...
      AccompanyMedicalMission:
        Begin
30      ChangeInAffectionSubject =
          Personality[Who].Affection[LDirObject] DIV 8
        If Who = DirObject Then
          ChangeInAffectionSubject = 16
        Else If Male ≠ Personality[LDirObject].Sex
35        ChangeInAffectionSubject = ChangeInAffectionSubject -
            16 x Personality.Relationship[LDirObject]
        End
      ...
      AccuseBurnCrops thru AccuseVandalize:
40      Begin
        ChangeInAffectionSubject =
          -(Personality[Who].Affection[LIndObject] DIV 4)
```

```
      ChangeInDominanceSubject =
        -SubstoryData[Verb].Import DIV 10
      ChangeInAffectionIndObject =
        -(Personality[Who].Trust[LSubject] DIV 8
5     End
      ...
      GetDrunkWith:
        Begin
        IF Who = DirObject Then
10        ChangeInAffectionSubject = 8
        End ...
      End Case
15
   If VirtualReaction Then
     Begin
     FlattersSubject = ChangeInAffectionSubject -
       ChangeInDominanceSubject + ChangeInTrustSubject
20   FlattersDirObject = ChangeInAffectionDirObject -
       ChangeInDominanceSubject + ChangeInTrustDirObject
     FlattersIndObject = ChangeInAffectionIndObject -
       ChangeInDominanceIndObject + ChangeInTrustIndObject
     End
25 Else
     Begin
     If ChangeInAffectionSubject ≠ 0 Then
       AdjustAffection(Who, LSubject, ChangeInAffectionSubject)
     If ChangeInDominanceSubject ≠ 0 Then
30     AdjustDominance(Who, LSubject, ChangeInDominanceSubject)
     If ChangeInAffectionDirObject ≠ 0 Then
       AdjustAffection(Who, LDirObject,
         ChangeInAffectionDirObject)
     If ChangeInDominanceSubject ≠ 0 Then
35     AdjustDominance(Who, LDirObject,
         ChangeInDominanceDirObject)
     If ChangeInAffectionIndObject ≠ 0 Then
       AdjustAffection(Who, LIndObject,
         ChangeInAffectionIndObject)
40   If ChangeInDominanceIndObject ≠ 0 Then
       AdjustDominance(Who, LIndObject,
         ChangeInDominanceIndObject)
```

- 43 -

```
    If ChangeInTrustSubject ≠ 0 Then
       AdjustTrust(Who, LSubject, ChangeInTrustSubject)
    If ChangeInTrustIndObject ≠ 0 Then
       AdjustTrust(Who, LIndObject, ChangeInTrustIndObject)
5   End
```

```
    Procedure: AjdustAffection(Who, ForWhom, HowMuch)

Value = Personality[Who].Affection[ForWhom]
10  Acceder = Personality[Who].Empathy
    IF Howmuch > 0 THEN
       TempLong = 100 - Value
    ELSE
       TempLong = 100 + Value
15  Value = Value + (Howmuch x TempLong x Acceder) DIV 10000
    Personality[Who].Affection[ForWhom] = Value
```

```
    Procedure: AjdustDominance(Who, ForWhom, HowMuch)
20
    Value = Personality[Who].Dominance[ForWhom]
    Acceder = Personality[Who].Submissive
    IF Howmuch > 0 THEN
       TempLong = 100 - Value
25  ELSE
       TempLong = 100 + Value
    Value = Value + (Howmuch x TempLong x Acceder) DIV 10000
    Personality[Who].Dominance[ForWhom] = Value
```

```
30
    Procedure: AjdustTrust(Who, ForWhom, HowMuch)

Value = Personality[Who].Trust[ForWhom]
    Acceder = Personality[Who].Gullible
35  IF Howmuch > 0 THEN
       TempLong = 100 - Value
    ELSE
       TempLong = 100 + Value
    Value = Value + (Howmuch x TempLong x Acceder) DIV 10000
40  Personality[Who].Trust[ForWhom] = Value
```

- 44 -

APPENDIX 5
REACT TO NEWS PROCEDURES

```
      PROCEDURE: ReactToNews (Substory, Who, HistoryPtr)
 5    Clear Result[] and Weight[] arrays
      If Who ≠ Arthur
        EmotionalReaction(Substory, Who, False, x1, x2, x3)

LSubject = Substory.Subject
10    LDirObject = Substory.DirObject
      LIndObject = Substory.IndObject For i = 1 to MaxConsequences
      Begin
15      NewDirObject[i] = LSubject
        If (Who = LSubject OR Who = LDirObject)
          NewIndObject[i] = 0
        Else
          NewIndOjbect[i] = LIndObject
20        NewThirdObject[i] = 0
      End Case Verb
        AttemptKiss:
25        Result[1] = SpurnKiss
          Result[2] = ShyAwayFromKis
          Result[3] = Tease
          Result[4] = FailedKiss
          Result[5] = Kiss
30        Result[6] = KissRedHot
          x = (Affection[LSubject] -
             (Faithfulness(Who,LSubject) DIV 2) + Submissiveness
             DIV 2) DIV 10
          SelectWeight (x,6,True)
35        ...
        AttemptRaid:
          IF Who=LSubject THEN
            BEGIN
              Result[1] = DisasterRaid
40            Result[2] = UnsuccessfulRaid
              Result[3] = SuccessfulRaid
              NewDirObject[1] = LDirObject
```

- 45 -

```
            NewDirObject[2] = LDirObject
            NewDirObject[3] = LDirObject
            x = 48 + (MyRandom MOD 32)
            Check History for prior event ="TipOffRaid" with
               subject equal to LSubject.
            If Check History is successful, THEN
               x = x + 40
               y = (Strength + Personality.[LDirObject].Strength
                  - x) DIV 32
               SelectWeight(y, 3, TRUE)
            END
      ...
      ColdGreeting:
         IF Who = LDirObject THEN
            BEGIN
               z = History[SourceEvent].CausalEvent
               IF History[z].Verb = BumpsInto THEN
                  BEGIN
                     Result[1] = ColdGreeting
                     Result[2] = SuspiciousGreeting
                     Result[3] = DominantGreeting
                     Result[4] = FormalGreeting
                     Result[5] = LukewarmGreeting
                     Weight[1] = 20 -
                        Personality[Who].Affection[LSubject]
                     Weight[2] = -10 -
                        Personality[Who].Trust[LSubject]
                     Weight[3] = Personality[Who].Dominance[LSubject]
                     Weight[4] = 10
                     IF Personality[Who].Affection[LSubject] < 30
                     THEN
                        Weight[5] = 2 ×
                           Personality[Who].Affection[LSubject]
                  END
               ELSE
                  BEGIN
                     Result[1] = GotToGoNow
                     Result[2] = NeverMind
                     Result[3] = WhatsEatingYou
                     Weight[1] = Personality[Who].Submissive -
                        Personality[Who].Affection[LSubject]
```

- 46 -

```
                Weight[2] = Personality[Who].Empathy -
                   Personality[Who].Affection[LSubject]
                Weight[3] = Personality[Who].Empathy +
                   Personality[Who].Affection[LSubject]
            END
        END
        ...
     End Case Select highest weight potential result:
        besti = i for Result[i] with highest Weight[i]
     Reaction.Subject = Who
     Reaction.Verb = Result[besti]        {Substory identifier}
     Reaction.DirObject = NewDirObject[besti]
     Reaction.IndObject = NewDirObject[besti]
     Reaction.ThirdObject = NewDirObject[besti]
     Reaction.Location = Substory.Location
     Reaction.CausalEvent = SourceEvent    {Prior Substory Index}
     Reaction.ConsequentEvent = 0

Enter Plan (Reaction) in Plan Queue
     Substory.Hijacked = Substory.Hijacked OR
        ( (Gameclock ≤ Substory.Time + 3) AND
          SubstoryData[BestResult].TimeToPrepare = 1 )
     END
     RETURN PROCEDURE: SelectWeight (SelectorValue, HighestIndex,
  OpenBottom)
     BEGIN
        FOR i = 1 TO HighestIndex DO
           BEGIN
              IF i = 1 THEN
                 BEGIN
                    IF OpenBottom THEN
                       LowerTest = -32000
                    ELSE
                       LowerTest = 0
                    UpperTest = 1
                 END
```

- 47 -

```
            ELSE
              BEGIN
                LowerTest = (i - 1)
                IF i < HighestIndex THEN
 5                UpperTest = LowerTest + 1
                ELSE
                  UpperTest = MaxInt
              END
            IF (SelectorValue > LowerTest) & (SelectorValue ≤
10          UpperTest) THEN
              Weight[i] = MaxInt
            LowerTest = LowerTest + 1
          END
      END
```

- 48 -

APPENDIX 6
GOSSIP PROCEDURE

```
    Procedure: Gossip (Who, Z)
 5

ToWhom =  the character at location Z having the highest
              loquaciousness value in Who's relationship table For each item in Who's headlines list
10     IX = history book index for current headlines item {If item is unknown to ToWhom}
       If Not (HistoryBook[IX].WhoKnows[ToWhom]) Then
         Begin
15          {Determine whether telling about this event would be
            beneficial or injurious to "Who":}
            EmotionalReaction (IX, Who, VirtualReaction=True,
              FlattersSubject, FlattersDirObject,
              FlattersIndObject)
20
            OldS = History[IX].Subject
            OldD = History[IX].DirObject
            OldI = History[z].IndObject
            GoodGossip = FlattersSubject  x
25            Personality[Who].Affection[OldS] +
              FlattersDirObject x Personality[Who].Affection[OldD]
            IF (OldI's value indicates the event had an indirect
              object) THEN
            GoodGossip = GoodGossip +
30            FlattersIndObject x Personality[Who].Affection[OldI]

{If the Headlines item represents a fallacious event}
         If History[IX].Fallacious THEN
           BEGIN
35            {If the headlines item represents a fallacious event
              involving the selected character "ToWhom", prevent it
              from being told to the selected character.}
              If History[IX].Subject = ToWhom OR
                History[IX].DirObject = ToWhom) THEN
40              GoodGossip = -1
           END
```

- 49 -

```
     IF GoodGossip > 0 THEN
       BEGIN
         Generate Plan to perform TellNews substory with
           selected character as the subject and the candidate
5          event as the indirect object:

Plan.SubstoryVerb = TellNews
         Plan.Subject = Moved Character
         Plan.DirObject = ToWhom
10       Plan.ThirdObject = IX {History Book Index for the
           news event}
         Plan.Time = Current Time + 1
       END
     Continue until GoodGossip > 0 OR Last Headlines Item has
15     been processed
     RETURN
```

What is claimed is:

1. A method of generating a sequence of images representing a dynamically generated story line, comprising:

establishing a set of characters;

defining a set of re-usable substories, a multiplicity of said substories representing an action by a subject comprising a selectable one of said characters where the action is performed with respect to at least one object comprising at least a selectable one of said characters; for each said substory, establishing a set of possible reaction substories comprising a subset of said set of re-usable substories;

establishing a plan list for storing plans indicating ones of said substories to be performed;

storing in said plan list an initial set of plans, each of said stored plans representing a substory to be performed;

executing ones of said substories represented by said plans stored in said plan list;

establishing a physical position for each of said characters and updating said characters' physical positions during said executing step;

establishing a current time and advancing said current time during said executing step;

generating, in reaction to each said executed substory, additional plans to perform additional ones of said substories wherein said additional substories comprise selected ones of said set of possible reaction substories for said executed substory; and storing said generated plans in said plan list; said plan list at times storing a multiplicity of said generated plans;

said generating plans step including receiving, in reaction to at least a subset of said executed substories, input from an end user and selecting at least a subset of said additional substories in accordance with said end user input;

said plan generating step including assigning each generated plan an earliest execution time and a set of associated characters including a subject and an object, wherein said subject and object are each a specified one of said characters;

each stored plan in said plan list including said assigned earliest execution time, subject and object, such that at various times at least a subset of said plans in said plan list have respective earliest execution times that are later than said current time;

at least a subset of said generated plans comprising deferred plans, where each deferred plan's execution is deferred because its earliest execution time is later than said current time and/or its associated characters are not physically proximate each other;

said executing step including selecting for execution one plan from those of said stored plans in said plan list whose associated earliest execution time is at least as early as said current time and that meet opportunity availability criteria, said opportunity availability criteria including a requirement that the characters associated with said one plan have physical positions that are proximate to one another;

wherein said generated plans are executed in a different order than those generated plans are added to said plan list by said generated plans storing step;

further including storing history data representing each specific substory that has been executed;

evaluating newsworthiness of said executed substories represented by said history data and selecting in accordance with predefined newsworthiness criteria a set of most newsworthy executed substories from the history data;

said set of reusable substories including at least one re-usable "gossip" substory having a subject, comprising a selectable one of said characters, who informs an object, comprising a different selectable one of said characters of one of said most newsworthy executed substories;

said substory executing step including executing said gossip substory so as to pass information about a first previously executed substory from a first one of said characters to a second one of said characters;

said plan generating step including generating a plan in reaction to execution of said gossip substory in which said second one of said characters is specified as the subject, and the planned substory is one of said set of possible reaction substories for said first previously executed substory.

2. A computer based system for generating a sequence of images representing a dynamically generated story line, comprising:

a computer memory that stores structures and executable procedures representing a set of characters and a set of re-usable substories; a multiplicity of said substories representing an action by a subject comprising a selectable one of said characters where the action is performed with respect to at least one object comprising at least a selectable one of said characters; for each said substory, establishing a set of possible reaction substories comprising a subset of said set of re-usable substories;

a video display for displaying said sequence of images;

a user input device;

a central processing unit coupled to said computer memory for executing said procedures stored in said computer memory while utilizing said data structures; coupled to said video display for generating said sequence images on said video display while executing said procedures stored in said computer memory; and coupled to said user input device for receiving input from an end user;

said data structures stored in said computer memory further including a plan list for storing plans indicating ones of said substories to be performed;

said procedures stored in said computer memory and executed by said central processing unit including:

substory execution procedures for executing ones of said substories represented by said plans stored in said plan list;

said substory execution procedures establishing a current time and advancing said current time while said substories are executed; said substory execution procedures establishing and updating a physical position for each of said characters;

planning procedures for generating, in reaction to each said executed substory, additional plans to perform additional ones of said substories wherein said additional substories comprise selected ones of said set of possible reaction substories for said executed substory, and for storing said generated plans in said plan list; said plan list at times storing a multiplicity of said generated plans; and said planning procedures including procedures for receiving, in reaction to at least a subset of said executed substories, input from an end user and selecting at least a subset of said additional substories in accordance with said end user input;

wherein said planning procedures assign each generated plan an earliest execution time and a set of associated characters including a subject and an object, wherein said subject and object are each a specified one of said characters;

each stored plan in said plan list including said assigned earliest execution time, subject and object, such that at various times at least a subset of said plans in said plan list have respective earliest execution times that are later than said current time;

at least a subset of said generated plans comprising deferred plans, where each deferred plan's execution is deferred because its earliest execution time is later than said current time and/or its associated characters are not physically proximate each other;

said substory execution procedures including instructions for selecting for execution one plan from those of said stored plans in said plan list whose associated earliest execution time is at least as early as said current time and that meet opportunity availability criteria, said opportunity availability criteria including a requirement that the characters associated with said one plan have physical positions that are proximate to one another; and said generated plans are executed in a different order than those generated plans are added to said plan list by said planning procedures;

said substory execution procedures including commands for storing history data representing each specific substory that has been executed;

said planning procedures including commands for, when generating a plan in reaction to at least one of said substories, reviewing substories in said history data, generating a set of weight values for said set of possible reaction substories, wherein at least one of said weight values is based on the presence or absence of a specific corresponding substory in said history data, and generating a plan to perform the one of said possible reaction substories having a maximum or minimum weight value.

3. A computer based system for generating a sequence of images representing a dynamically generated story line, comprising:

a computer memory that stores structures and executable procedures representing a set of characters and a set of re-usable substories; a multiplicity of said substories representing an action by a subject comprising a selectable one of said characters where the action is performed with respect to at least one object comprising at least a selectable one of said characters; for each said substory, establishing a set of possible reaction substories comprising a subset of said set of re-usable substories;

a video display for displaying said sequence of images;

a user input device;

a central processing unit coupled to said computer memory for executing said procedures stored in said computer memory while utilizing said data structures; coupled to said video display for generating said sequence images on said video display while executing said procedures stored in said computer memory; and coupled to said user input device for receiving input from an end user;

said data structures stored in said computer memory further including a plan list for storing plans indicating ones of said substories to be performed;

said procedures stored in said computer memory and executed by said central processing unit including:

substory execution procedures for executing ones of said substories represented by said plans stored in said plan list;

said substory execution procedures establishing a current time and advancing said current time while said substories are executed; said substory execution procedures establishing and updating a physical position for each of said characters;

planning procedures for generating, in reaction to each said executed substory, additional plans to perform additional ones of said substories wherein said additional substories comprise selected ones of said set of possible reaction substories for said executed substory, and for storing said generated plans in said plan list; said plan list at times storing a multiplicity of said generated plans; and said planning procedures including procedures for receiving, in reaction to at least a subset of said executed substories, input from an end user and selecting at least a subset of said additional substories in accordance with said end user input;

said planning procedures assign each generated plan an earliest execution time and a set of associated characters including a subject and an object, wherein said subject and object are each a specified one of said characters;

each stored plan in said plan list including said assigned earliest execution time, subject and object, such that at various times at least a subset of said plans in said plan list have respective earliest execution times that are later than said current time;

at least a subset of said generated plans comprising deferred plans, where each deferred plan's execution is deferred because its earliest execution time is later than said current time and/or its associated characters are not physically proximate each other;

said substory execution procedures including instructions for selecting for execution one plan from those of said stored plans in said plan list whose associated earliest execution time is at least as early as said current time and that meet opportunity availability criteria, said opportunity availability criteria including a requirement that the characters associated with said one plan have physical positions that are proximate to one another; and said generated plans are executed in a different order than those generated plans are added to said plan list by said planning procedures;

said data structures stored in said computer memory further including history data representing each specific substory that has been executed;

said substory execution procedures including commands for evaluating newsworthiness of said executed substories represented by said history data and selecting in accordance with predefined newsworthiness criteria a set of most newsworthy executed substories;

said set of reusable substories including at least one re-usable "gossip" substory having a subject, comprising a selectable one of said characters, who informs an object, comprising a different selectable one of said characters of one of said most newsworthy executed substories;

said substory execution procedures including commands for executing said gossip substory so as to pass information about a first previously executed substory from a first one of said characters to a second one of said characters;

said planning procedures including a procedure for generating a plan in reaction to execution of said gossip substory in which said second one of said characters is specified as the subject, and the planned substory is one of said set of possible reaction substories for said first previously executed substory.

4. A method of generating a sequence of images representing a dynamically generated story line, comprising:

establishing a set of characters;

defining a set of re-usable substories, a multiplicity of said substories representing an action by a subject comprising a selectable one of said characters where the action is performed with respect to at least one object comprising at least a selectable one of said characters; for each said substory, establishing a set of possible reaction substories comprising a subset of said set of re-usable substories;

establishing a plan list for storing plans indicating ones of said substories to be performed;

storing in said plan list an initial set of plans, each of said stored plans representing a substory to be performed;

executing ones of said substories represented by said plans stored in said plan list;

establishing a current time and advancing said current time during said executing step;

generating, in reaction to each said executed substory, additional plans to perform additional ones of said substories wherein said additional substories comprise selected ones of said set of possible reaction substories for said executed substory; and storing said generated plans in said plan list; said plan list at times storing a multiplicity of said generated plans;

said generating plans step including receiving, in reaction to at least a subset of said executed substories, input from an end user and selecting at least a subset of said additional substories in accordance with said end user input;

storing history data representing at least a subset of said executed substories; and evaluating newsworthiness of said executed substories represented by said history data and selecting in accordance with predefined newsworthiness criteria a set of most newsworthy executed substories from the history data;

said set of reusable substories including at least one re-usable "gossip" substory having a subject, comprising a selectable one of said characters, who informs an object, comprising a different selectable one of said characters of one of said most newsworthy executed substories;

said substory executing step including executing said gossip substory so as to pass information about a first previously executed substory from a first one of said characters to a second one of said characters;

said plan generating step including generating a plan in reaction to execution of said gossip substory in which said second one of said characters is specified as the subject, and the planned substory is one of said set of possible reaction substories for said first previously executed substory; and said newsworthiness evaluation step includes establishing a separate list of most newsworthy executed substories for each of at least plurality of said characters, wherein said predefined newsworthiness criteria takes into account whether each executed substory represented by said history data reflects positively or negatively upon the character associated with the list of most newsworthy executed substories to which said executed substory may be assigned.

5. The method of claim 4, wherein said history data storing step including storing at least one false event as an executed event and denoting each false event in the history data as a false event, each stored false event having an associated subject and object, each comprising one of said characters;

said predefined newsworthiness criteria include criteria denoting said false events as having high newsworthiness; and said gossip substory executing step includes selecting an executed event from said gossip substory's subject's list of most newsworthy executed substories which meets predefined gossip selection criteria with respect to said gossip substory's object;

whereby said method includes passing information about said false events from one character to another.

6. A computer based system for generating a sequence of images representing dynamically generated story line, comprising:

a computer memory that stores structures and executable procedures representing a set of characters and a set of re-usable substories; a multiplicity of said substories representing an action by a subject comprising a selectable one of said characters where the action is performed with respect to at least one object comprising at least a selectable one of said characters; for each said substory, establishing a set of possible reaction substories comprising a subset of said set of re-usable substories;

a video display for displaying said sequence of images;

a user input device;

a central processing unit coupled to said computer memory for executing said procedures stored in said computer memory while utilizing said data structures; coupled to said video display for generating said sequence images on said video display while executing said procedures stored in said computer memory; and coupled to said user input device for receiving input from an end user;

said data structures stored in said computer memory further including a plan list for storing plans indicating ones of said substories to be performed;

said procedures stored in said computer memory and executed by said central processing unit including:

substory execution procedures for executing, in sequence, ones of said substories represented by said plans stored in said plan list;

said substory execution procedures establishing a current time and advancing said current time while said substories are executed;

planning procedures for generating, in reaction to each said executed substory, additional plans to perform additional ones of said substories wherein said additional substories comprise selected ones of said set of possible reaction substories for said executed substory, and for storing said generated plans in said plan list; said plan list at times storing a multiplicity of said generated plans; and said planning procedures step including procedures for receiving, in reaction to at least a subset of said executed substories, input from an end user and selecting at least a subset of said additional substories in accordance with said end user input;

wherein said data structures stored in said computer memory further including history data representing at least a subset of said executed substories;

said substory execution procedures including commands for evaluating newsworthiness of said executed substories represented by said history data and selecting in accordance with predefined newsworthiness criteria a set of most newsworthy executed substories;

said set of reusable substories including at least one re-usable "gossip" substory having a subject, comprising a selectable one of said characters, who informs an object, comprising a different selectable one of said characters of one of said most newsworthy executed substories;

said substory execution procedures including commands for executing said gossip substory so as to pass information about a first previously executed substory from a first one of said characters to a second one of said characters;

said planning procedures including a procedure for generating a plan in reaction to execution of said gossip substory in which said second one of said characters is specified as the subject, and the planned substory is one of said set of possible reaction substories for said first previously executed substory and said newsworthiness evaluation commands include commands for establishing a separate list of most newsworthy executed substories for each of at least plurality of said characters, wherein said predefined newsworthiness criteria takes into account whether each executed substory represented by said history data reflects positively or negatively upon the character associated with the list of most newsworthy executed substories to which said executed substory may be assigned.

7. The system of claim 6, wherein said stored history data includes data representing at least one false event as an executed event and denoting each false event in the history data as a false event, each stored false event having an associated subject and object, each comprising one of said characters;

said predefined newsworthiness criteria include criteria denoting said false events as having high newsworthiness; and said gossip substory executing commands including commands for selecting an executed event from said gossip substory's subject's list of most newsworthy executed substories which meets predefined gossip selection criteria with respect to said gossip substory's object;

whereby said system includes commands for passing information about said false events from one character to another.

8. A method of generating a sequence of images representing a dynamically generated story line, comprising:

establishing a set of characters;

defining a set of re-usable substories, a multiplicity of said substories representing an action by a subject comprising a selectable one of said characters where the action is performed with respect to at least one object comprising at least a selectable one of said characters; for each said substory, establishing a set of possible reaction substories comprising a subset of said set of re-usable substories;

establishing a plan list for storing plans indicating ones of said substories to be performed;

storing in said plan list an initial set of plans, each of said stored plans representing a substory to be performed;

executing ones of said substories represented by said plans stored in said plan list;

establishing a current time and advancing said current time during said executing step;

generating, in reaction to each said executed substory, additional plans to perform additional ones of said substories wherein said additional substories comprise selected ones of said set of possible reaction substories for said executed substory; and storing said generated plans in said plan list; said plan list at times storing a multiplicity of said generated plans;

said generating plans step including receiving, in reaction to at least a subset of said executed substories, input from an end user and selecting at least a subset of said additional substories in accordance with said end user input;

storing history data representing at least a subset of said executed substories; and evaluating newsworthiness of said executed substories represented by said history data and selecting in accordance with predefined newsworthiness criteria a set of most newsworthy executed substories from the history data;

said set of reusable substories including at least one re-usable "gossip" substory having a subject, comprising a selectable one of said characters, who informs an object, comprising a different selectable one of said characters of one of said most newsworthy executed substories;

said substory executing step including executing said gossip substory so as to pass information about a first previously executed substory from a first one of said characters to a second one of said characters;

said plan generating step including generating a plan in reaction to execution of said gossip substory in which said second one of said characters is specified as the subject, and the planned substory is one of said set of possible reaction substories for said first previously executed substory;

said history data storing step including storing at least one false event as an executed event and denoting each false event in the history data as a false event, each stored false event having an associated subject and object, each comprising one of said characters;

said predefined newsworthiness criteria include criteria denoting said false events as having high newsworthiness; and said gossip substory executing step includes selecting an executed event from said gossip substory's subject's list of most newsworthy executed substories which meets predefined gossip selection criteria with respect to said gossip substory's object;

whereby said method includes passing information about said false events from one character to another.

9. A computer based system for generating a sequence of images representing a dynamically generated story line, comprising:

a computer memory that stores structures and executable procedures representing a set of characters and a set of re-usable substories; a multiplicity of said substories representing an action by a subject comprising a selectable one of said characters where the action is performed with respect to at least one object comprising at least a selectable one of said characters; for each said substory, establishing a set of possible reaction substories comprising a subset of said set of re-usable substories;

a video display for displaying said sequence of images;

a user input device;

a central processing unit coupled to said computer memory for executing said procedures stored in said computer memory while utilizing said data structures; coupled to said video display for generating said sequence images on said video display while executing said procedures stored in said computer memory; and coupled to said user input device for receiving input from an end user;

said data structures stored in said computer memory further including a plan list for storing plans indicating ones of said substories to be performed;

said procedures stored in said computer memory and executed by said central processing unit including:

substory execution procedures for executing, in sequence, ones of said substories represented by said plans stored in said plan list;

said substory execution procedures establishing a current time and advancing said current time while said substories are executed;

planning procedures for generating, in reaction to each said executed substory, additional plans to perform additional ones of said substories wherein said additional substories comprise selected ones of said set of possible reaction substories for said executed substory, and for storing said generated plans in said plan list; said plan list at times storing a multiplicity of said generated plans; and said planning procedures step including procedures for receiving, in reaction to at least a subset of said executed substories, input from an end user and selecting at least a subset of said additional substories in accordance with said end user input;

wherein said data structures stored in said computer memory further including history data representing at least a subset of said executed substories;

said substory execution procedures including commands for evaluating newsworthiness of said executed substories represented by said history data and selecting in accordance with predefined newsworthiness criteria a set of most newsworthy executed substories;

said set of reusable substories including at least one re-usable "gossip" substory having a subject, comprising a selectable one of said characters, who informs an object, comprising a different selectable one of said characters of one of said most newsworthy executed substories;

said substory execution procedures including commands for executing said gossip substory so as to pass information about a first previously executed substory from a first one of said characters to a second one of said characters;

said planning procedures including a procedure for generating a plan in reaction to execution of said gossip substory in which said second one of said characters is specified as the subject, and the planned substory is one of said set of possible reaction substories for said first previously executed substory;

said stored history data includes data representing at least one false event as an executed event and denoting each false event in the history data as a false event, each stored false event having an associated subject and object, each comprising one of said characters;

said predefined newsworthiness criteria include criteria denoting said false events as having high newsworthiness; and said gossip substory executing commands including commands for selecting an executed event from said gossip substory's subject's list of most newsworthy executed substories which meets predefined gossip selection criteria with respect to said gossip substory's object;

whereby said system includes commands for passing information about said false events from one character to another.

* * * * *